US012593335B2

(12) United States Patent
Abotabl et al.

(10) Patent No.: US 12,593,335 B2
(45) Date of Patent: Mar. 31, 2026

(54) LOGICAL CHANNELS AND SCHEDULING REQUEST CONFIGURATIONS FOR FULL-DUPLEX MODES AND HALF-DUPLEX MODES

(71) Applicant: QUALCOMM Incorporated, San Diego, CA (US)

(72) Inventors: Ahmed Attia Abotabl, San Diego, CA (US); Linhai He, San Diego, CA (US); Ruiming Zheng, Beijing (CN); Muhammad Sayed Khairy Abdelghaffar, San Jose, CA (US); Abdelrahman Mohamed Ahmed Mohamed Ibrahim, San Diego, CA (US); Wanshi Chen, San Diego, CA (US); Gavin Bernard Horn, La Jolla, CA (US); Krishna Kiran Mukkavilli, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 18/255,278

(22) PCT Filed: Feb. 25, 2021

(86) PCT No.: PCT/CN2021/077836
§ 371 (c)(1),
(2) Date: May 31, 2023

(87) PCT Pub. No.: WO2022/178749
PCT Pub. Date: Sep. 1, 2022

(65) Prior Publication Data
US 2024/0032042 A1     Jan. 25, 2024

(51) Int. Cl.
| | |
|---|---|
| H04W 72/21 | (2023.01) |
| H04L 5/16 | (2006.01) |
| H04W 88/06 | (2009.01) |

(52) U.S. Cl.
CPC ............... H04W 72/21 (2023.01); H04L 5/16 (2013.01); H04W 88/06 (2013.01)

(58) Field of Classification Search
CPC . H04W 72/02; H04W 72/04; H04W 72/0446; H04W 72/21; H04W 72/23;
(Continued)

(56) References Cited

U.S. PATENT DOCUMENTS

| | | | |
|---|---|---|---|
| 10,367,633 | B2 | 7/2019 | Li et al. |
| 10,390,254 | B2 | 8/2019 | Kim et al. |

(Continued)

FOREIGN PATENT DOCUMENTS

| | | |
|---|---|---|
| CN | 101675700 A | 3/2010 |
| CN | 102014442 A | 4/2011 |

OTHER PUBLICATIONS

APPLE: "Clarification on the SR and PUSCH conflict with equal LCH priority", R2-2009483, 3rd Generation Partnership Project, Mobile Competence Centre, 650, Route Des Lucioles, F-06921, Sophia-Antipolis Cedex, France, vol. RAN WG2, No. Online, Nov. 2, 2020-Nov. 13, 2020, Oct. 23, 2020, 5 Pages, XP052362535.

(Continued)

*Primary Examiner* — Bo Hui A Zhu
(74) *Attorney, Agent, or Firm* — QUALCOMM Incorporated

(57) ABSTRACT

Various aspects of the present disclosure generally relate to wireless communication. In some aspects, a user equipment (UE) may receive a configuration message indicating a scheduling request configuration that includes at least one resource associated with a half-duplex mode of the UE and (Continued)

at least one resource associated with a full-duplex mode of the UE. The UE may transmit a scheduling request using the at least one resource associated with the half-duplex mode or the at least one resource associated with the full-duplex mode. Additionally, or alternatively, the configuration message may indicate a logical channel that maps to a corresponding scheduling request configuration associated with a half-duplex mode of the UE, to a corresponding scheduling request configuration associated with a full-duplex mode of the UE, or to a combination thereof. Accordingly, the UE may transmit the scheduling request using the logical channel. Numerous other aspects are described.

30 Claims, 12 Drawing Sheets

(58) Field of Classification Search
CPC ..... H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

2016/0308662 A1* 10/2016 Li .............................. H04L 5/16
2020/0092685 A1* 3/2020 Fehrenbach .......... H04W 72/23

OTHER PUBLICATIONS

Supplementary European Search Report—EP21927190—Search Authority—The Hague—Oct. 15, 2024.
International Search Report and Written Opinion—PCT/CN2021/077836—ISA/EPO—Nov. 17, 2021.

* cited by examiner

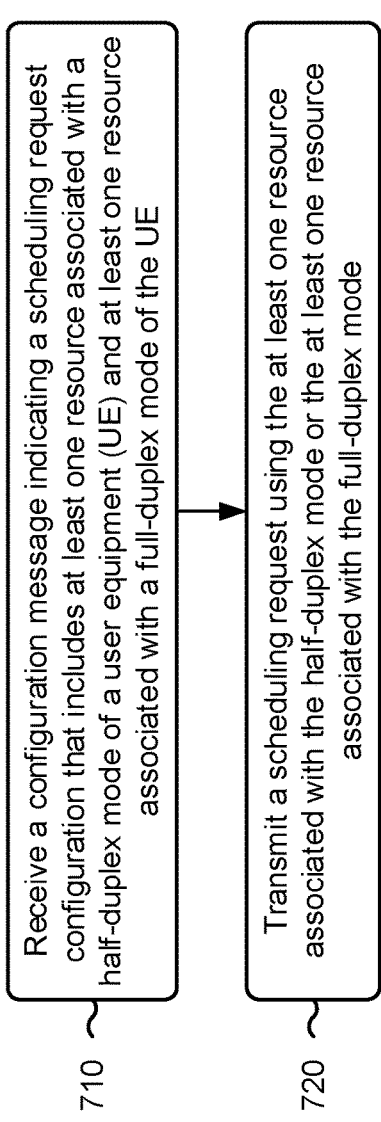

710 Receive a configuration message indicating a scheduling request configuration that includes at least one resource associated with a half-duplex mode of a user equipment (UE) and at least one resource associated with a full-duplex mode of the UE 720 Transmit a scheduling request using the at least one resource associated with the half-duplex mode or the at least one resource associated with the full-duplex mode

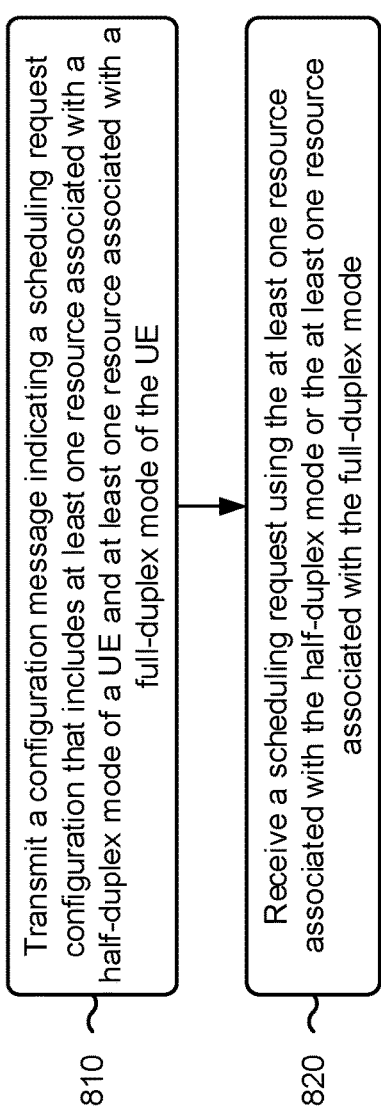

Transmit a configuration message indicating a scheduling request configuration that includes at least one resource associated with a half-duplex mode of a UE and at least one resource associated with a full-duplex mode of the UE

810

Receive a scheduling request using the at least one resource associated with the half-duplex mode or the at least one resource associated with the full-duplex mode

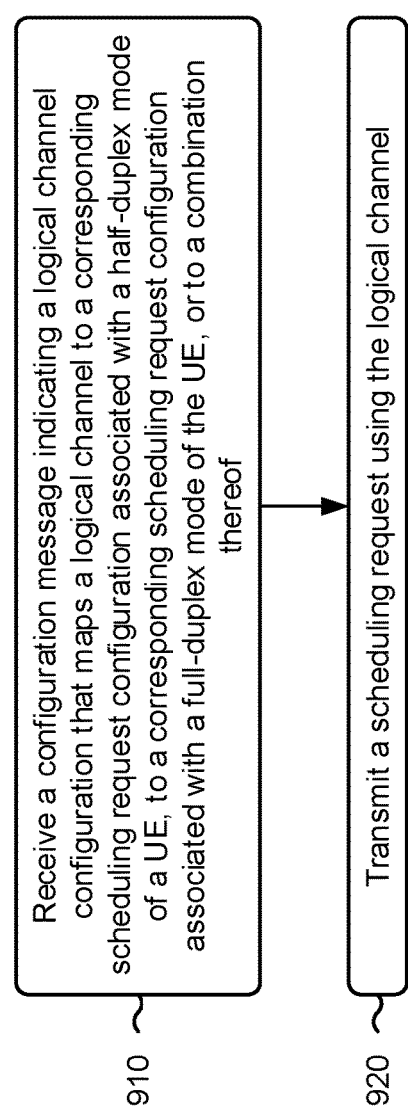

910 Receive a configuration message indicating a logical channel configuration that maps a logical channel to a corresponding scheduling request configuration associated with a half-duplex mode of a UE, to a corresponding scheduling request configuration associated with a full-duplex mode of the UE, or to a combination thereof 920 Transmit a scheduling request using the logical channel

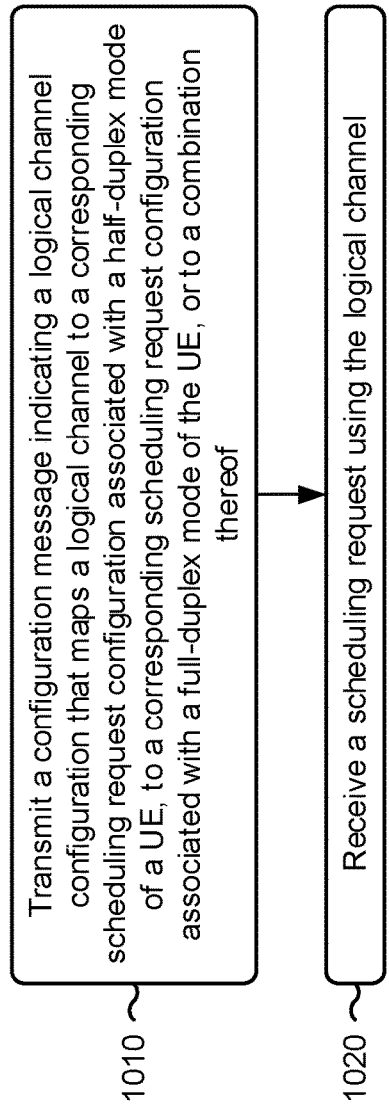

Transmit a configuration message indicating a logical channel configuration that maps a logical channel to a corresponding scheduling request configuration associated with a half-duplex mode of a UE, to a corresponding scheduling request configuration associated with a full-duplex mode of the UE, or to a combination thereof

1010

Receive a scheduling request using the logical channel

LOGICAL CHANNELS AND SCHEDULING REQUEST CONFIGURATIONS FOR FULL-DUPLEX MODES AND HALF-DUPLEX MODES

CROSS-REFERENCE TO RELATED APPLICATION

This Patent Application is a 371 national stage of PCT Application No. PCT/CN2021/077836 filed on Feb. 25, 2021, entitled "LOGICAL CHANNELS AND SCHEDULING REQUEST CONFIGURATIONS FOR FULL-DUPLEX MODES AND HALF-DUPLEX MODES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for using logical channels and scheduling request configurations for full-duplex and half-duplex modes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors coupled to the memory, the memory and the one or more processors configured to receive, from a base station, a configuration message indicating a scheduling request configuration that includes at least one resource associated with a half-duplex mode of the UE and at least one resource associated with a full-duplex mode of the UE; and transmit, to the base station, a scheduling request using the at least one resource associated with the half-duplex mode or the at least one resource associated with the full-duplex mode.

In some aspects, a base station for wireless communication includes a memory and one or more processors coupled to the memory, the memory and the one or more processors configured to transmit, to a UE, a configuration message indicating a scheduling request configuration that includes at least one resource associated with a half-duplex mode of the UE and at least one resource associated with a full-duplex mode of the UE; and receive, from the UE, a scheduling request using the at least one resource associated with the half-duplex mode or the at least one resource associated with the full-duplex mode.

In some aspects, a UE for wireless communication includes a memory and one or more processors coupled to the memory, the memory and the one or more processors configured to receive, from a base station, a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof; and transmit, to the base station, a scheduling request using the logical channel.

In some aspects, a base station for wireless communication includes a memory and one or more processors coupled to the memory, the memory and the one or more processors configured to transmit, to a UE, a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof; and receive, from the UE, a scheduling request using the logical channel.

In some aspects, a method of wireless communication performed by a UE includes receiving, from a base station, a configuration message indicating a scheduling request configuration that includes at least one resource associated with a half-duplex mode of the UE and at least one resource associated with a full-duplex mode of the UE; and transmitting, to the base station, a scheduling request using the at least one resource associated with the half-duplex mode or the at least one resource associated with the full-duplex mode.

In some aspects, a method of wireless communication performed by a base station includes transmitting, to a UE, a configuration message indicating a scheduling request configuration that includes at least one resource associated with a half-duplex mode of the UE and at least one resource associated with a full-duplex mode of the UE; and receiving, from the UE, a scheduling request using the at least one resource associated with the half-duplex mode or the at least one resource associated with the full-duplex mode.

In some aspects, a method of wireless communication performed by a UE includes receiving, from a base station, a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof, and transmitting, to the base station, a scheduling request using the logical channel.

In some aspects, a method of wireless communication performed by a base station includes transmitting, to a UE, a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof; and receiving, from the UE, a scheduling request using the logical channel.

In some aspects, a non-transitory computer-readable medium storing a set of instructions for wireless communication includes one or more instructions that, when executed by one or more processors of a UE, cause the UE to receive, from a base station, a configuration message indicating a scheduling request configuration that includes at least one resource associated with a half-duplex mode of the UE and at least one resource associated with a full-duplex mode of the UE; and transmit, to the base station, a scheduling request using the at least one resource associated with the half-duplex mode or the at least one resource associated with the full-duplex mode.

In some aspects, a non-transitory computer-readable medium storing a set of instructions for wireless communication includes one or more instructions that, when executed by one or more processors of a base station, cause the base station to transmit, to a UE, a configuration message indicating a scheduling request configuration that includes at least one resource associated with a half-duplex mode of the UE and at least one resource associated with a full-duplex mode of the UE; and receive, from the UE, a scheduling request using the at least one resource associated with the half-duplex mode or the at least one resource associated with the full-duplex mode.

In some aspects, a non-transitory computer-readable medium storing a set of instructions for wireless communication includes one or more instructions that, when executed by one or more processors of a UE, cause the UE to receive, from a base station, a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof, and transmit, to the base station, a scheduling request using the logical channel.

In some aspects, a non-transitory computer-readable medium storing a set of instructions for wireless communication includes one or more instructions that, when executed by one or more processors of a base station, cause the base station to transmit, to a UE, a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof, and receive, from the UE, a scheduling request using the logical channel.

In some aspects, an apparatus for wireless communication includes means for receiving, from a base station, a configuration message indicating a scheduling request configuration that includes at least one resource associated with a half-duplex mode of the apparatus and at least one resource associated with a full-duplex mode of the apparatus; and means for transmitting, to the base station, a scheduling request using the at least one resource associated with the half-duplex mode or the at least one resource associated with the full-duplex mode.

In some aspects, an apparatus for wireless communication includes means for transmitting, to a UE, a configuration message indicating a scheduling request configuration that includes at least one resource associated with a half-duplex mode of the UE and at least one resource associated with a full-duplex mode of the UE; and means for receiving, from the UE, a scheduling request using the at least one resource associated with the half-duplex mode or the at least one resource associated with the full-duplex mode.

In some aspects, an apparatus for wireless communication includes means for receiving, from a base station, a configuration message indicating a logical channel configuration that maps a logical channel to a corresponding scheduling request configuration associated with a half-duplex mode of the apparatus, to a corresponding scheduling request configuration associated with a full-duplex mode of the apparatus, or to a combination thereof; and means for transmitting, to the base station, a scheduling request using the logical channel.

In some aspects, an apparatus for wireless communication includes means for transmitting, to a UE, a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof, and means for receiving, from the UE, a scheduling request using the logical channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7, 8, 9, and 10 are diagrams illustrating example processes associated with using logical channels and scheduling request configurations for full-duplex and half-duplex modes, in accordance with the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
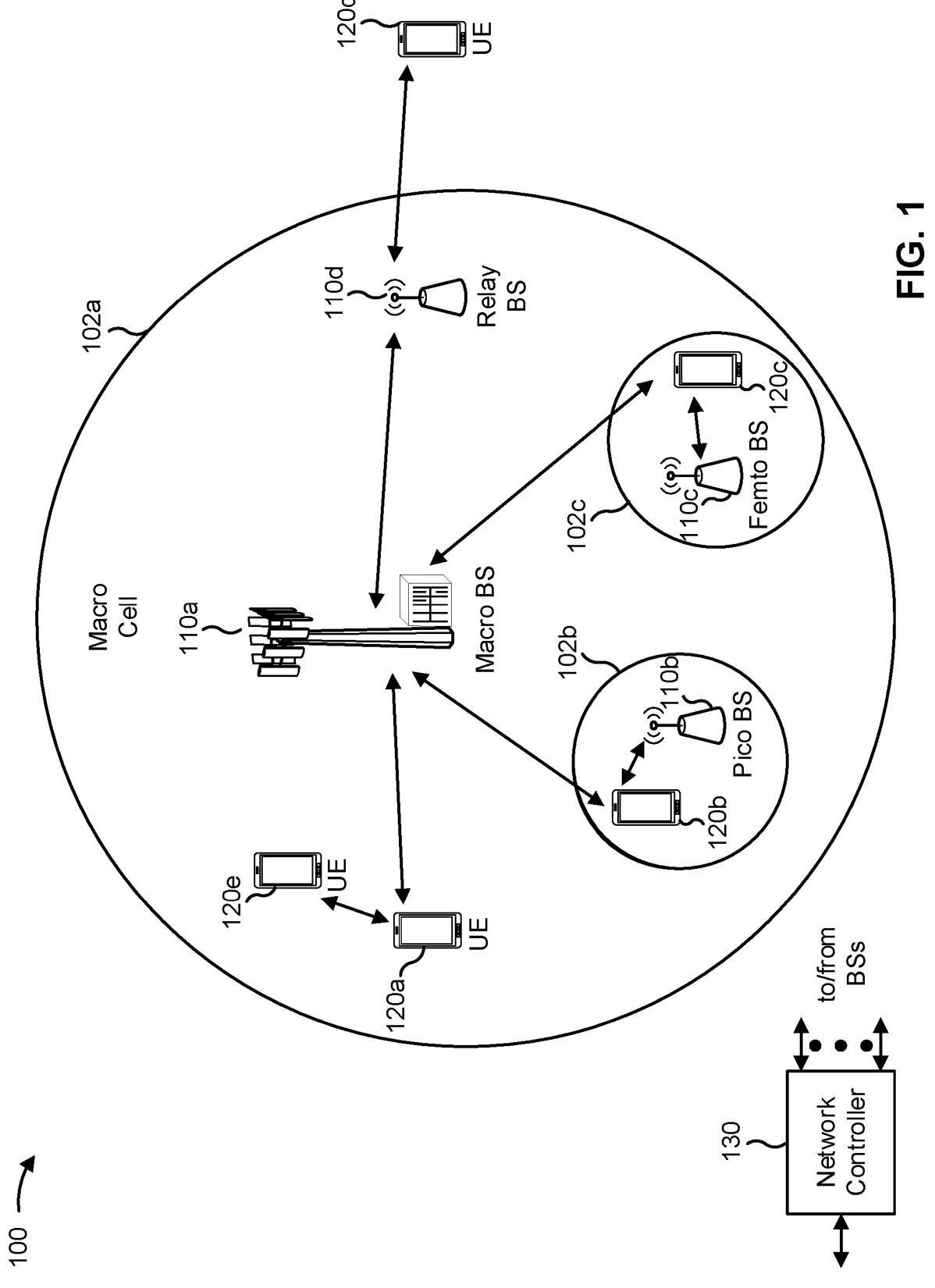
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TR", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
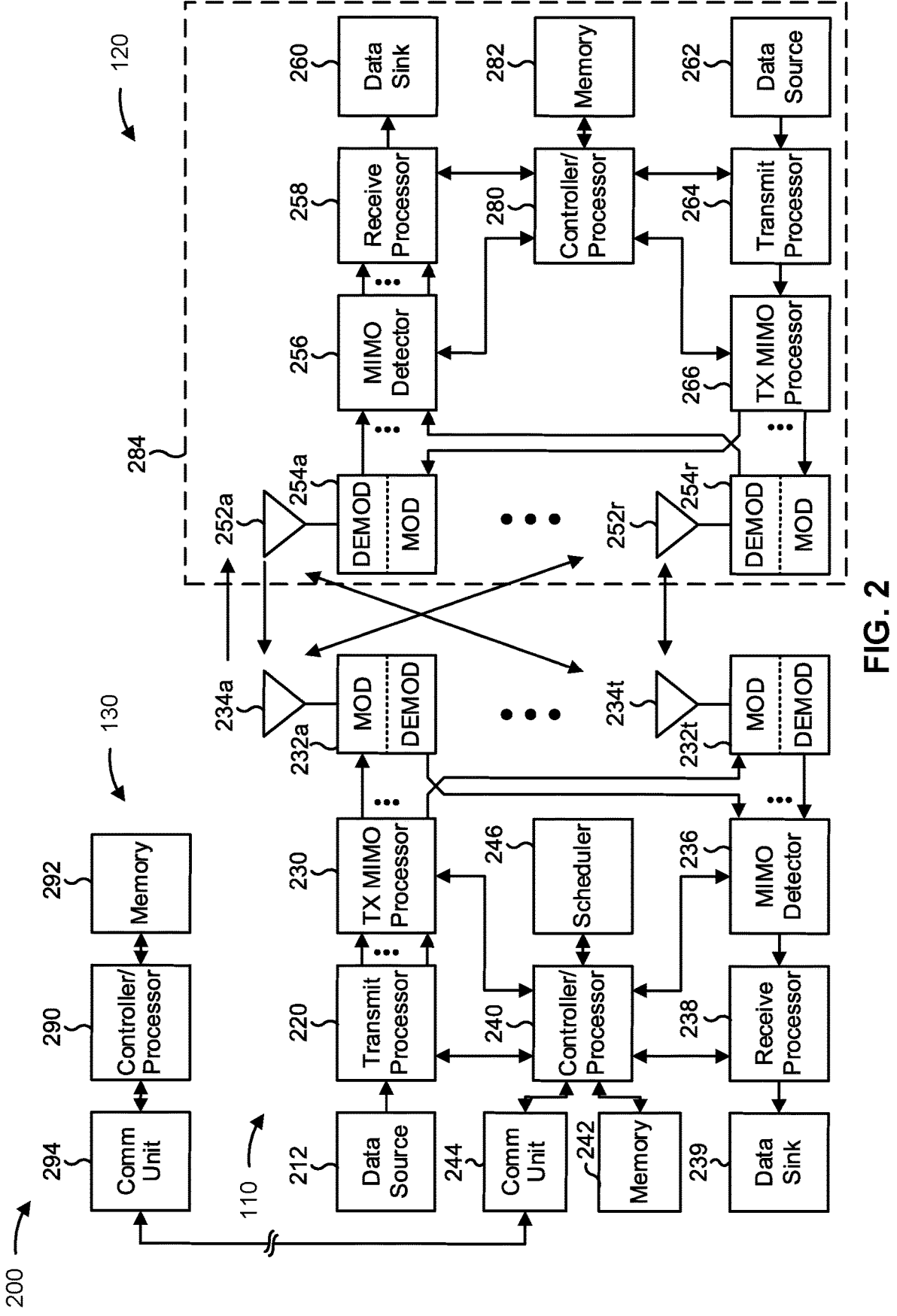
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 4-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 4-10).

Controller/processor 240 of base station 110, controller/processor 280 of UE 120, and/or any other component(s) of FIG. 2 may perform one or more techniques associated with using logical channels and scheduling request configurations for full-duplex and half-duplex modes, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a UE (e.g., the UE 120, UE 302 of FIG. 3, and/or apparatus 1100 of FIG. 11) may include means for receiving, from a base station (e.g., the base station 110, base station 304 of FIG. 3, and/or apparatus 1200 of FIG. 12), a configuration message indicating a scheduling request configuration that includes at least one resource associated with a half-duplex mode of the UE and at least one resource associated with a full-duplex mode of the UE; and/or means for transmitting, to the base station, a scheduling request using the at least one resource associated with the half-duplex mode or the at least one resource associated with the full-duplex mode. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282. In some aspects, the UE may further include means for transmitting, to the base station and after transmitting the scheduling request, a random access preamble, based at least in part on a determination that a counter limit is satisfied. As an alternative, the UE may include means for transmitting, to the base station and after transmitting the scheduling request, a random access preamble, based at least in part on a determination that a first counter limit is satisfied or a determination that a second counter limit is satisfied.

In some aspects, a base station (e.g., the base station 110, base station 304 of FIG. 3, and/or apparatus 1200 of FIG. 12) may include means for transmitting, to a UE (e.g., the UE 120, UE 302 of FIG. 3, and/or apparatus 1100 of FIG. 11), a configuration message indicating a scheduling request configuration that includes at least one resource associated with a half-duplex mode of the UE and at least one resource associated with a full-duplex mode of the UE; and/or means for receiving, from the UE, a scheduling request using the at least one resource associated with the half-duplex mode or the at least one resource associated with the full-duplex mode. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the base station may further include means for receiving, from the UE and after receiving the scheduling request, a random access preamble, based at least in part on a counter limit being satisfied. As an alternative, the base station may include means for receiving, from the UE and after receiving the scheduling request, a random access preamble, based at least in part on a first counter limit being satisfied or a second counter limit being satisfied.

In some aspects, a UE (e.g., the UE 120, UE 302 of FIG. 3, and/or apparatus 1100 of FIG. 11) may include means for receiving, from a base station (e.g., the base station 110, base station 304 of FIG. 3, and/or apparatus 1200 of FIG. 12), a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof, and/or means for transmitting, to the base station, a scheduling request using the logical channel. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a base station (e.g., the base station 110, base station 304 of FIG. 3, and/or apparatus 1200 of FIG. 12) may include means for transmitting, to a UE (e.g., the UE 120, UE 302 of FIG. 3, and/or apparatus 1100 of FIG. 11), a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof, and/or means for receiving, from the UE, a scheduling request using the logical channel. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figures 3A, 3B, 3C:
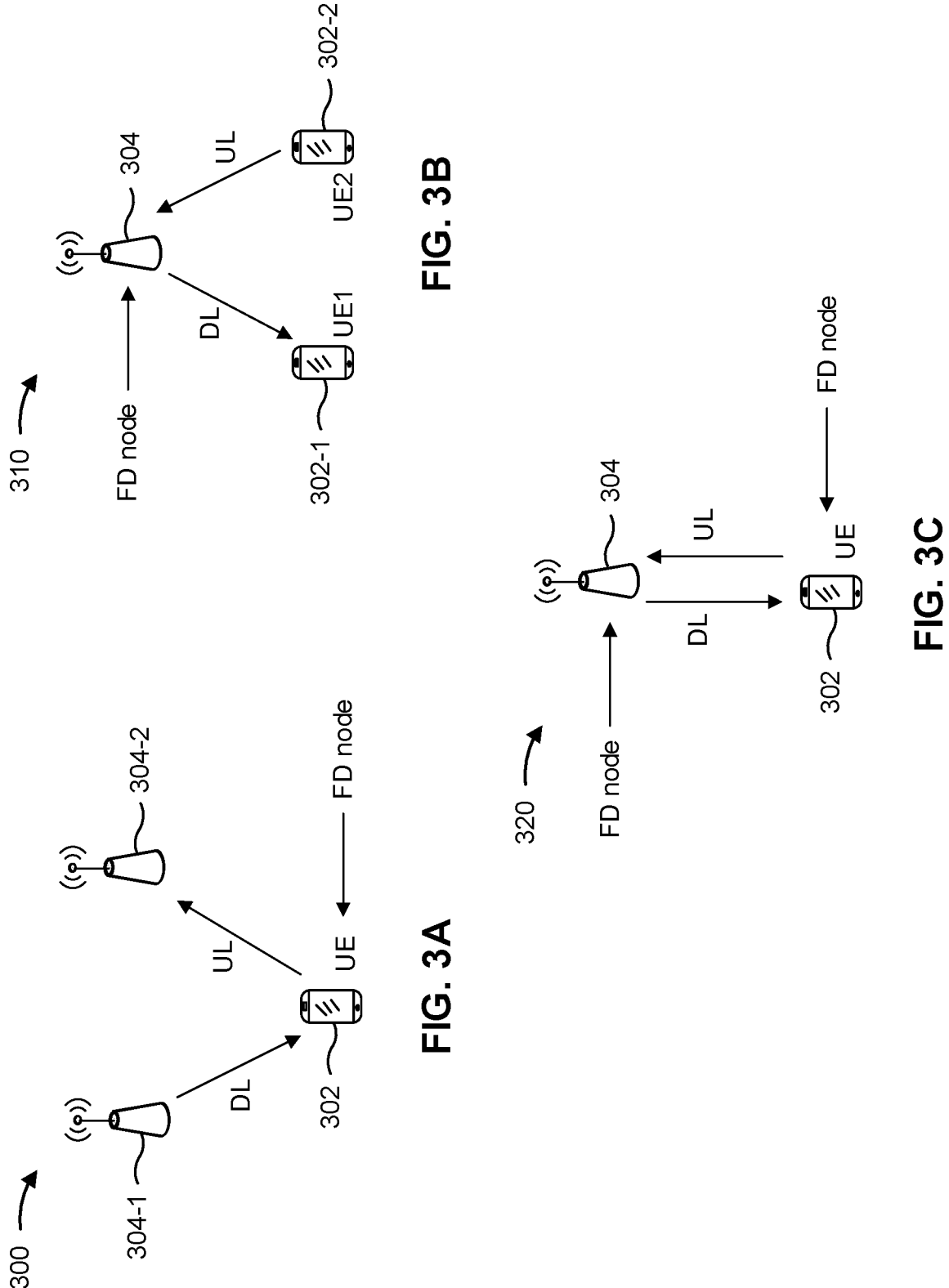
FIGS. 3A, 3B, and 3C are diagrams illustrating examples of full-duplex communication, in accordance with the present disclosure.

FIGS. 3A-3C are diagrams illustrating examples 300, 310, and 320 of full-duplex communication. As shown in FIGS. 3A-3C, examples 300, 310, and 320 include one or more UEs 302 in communication with one or more base stations 304, TRPs 304, and/or similarly devices in a wireless network that supports full-duplex communication. However, it will be appreciated that the devices shown in FIGS. 3A-3C are provided by way of example only, and that the wireless network may support full-duplex communication between other devices (e.g., between a mobile termination node and a control node, between a child node and a parent node in an integrated access backhaul (IAB) network, between a scheduled node and a scheduling node, and/or the like).

As shown in FIG. 3A, example 300 includes a UE 302 in communication with two base stations (e.g., TRPs) 304-1, 304-2. As shown in FIG. 3A, the UE 302 may transmit one or more uplink transmissions to base station 304-1 and may concurrently receive one or more downlink transmissions from base station 304-2. Accordingly, in the example 300 shown in FIG. 3A, full-duplex communication is enabled for the UE 302, which may be operating as a full-duplex node, but not for the base stations 304-1, 304-2, which may be operating as half-duplex nodes. For example, the UE 302 may have at least two antenna panels (each including one or more antenna elements) such that at least one antenna panel may be used to transmit uplink transmissions concurrently with reception of downlink transmissions by at least one other antenna panel.

Additionally, or alternatively, as shown in FIG. 3B, example 310 includes two UEs, UE1 302-1 and UE2 302-2 in communication with a base station 304. In this case, the base station 304 may transmit one or more downlink transmissions to the UE1 302-1 and may concurrently receive one or more uplink transmissions from the UE2 302-2. Accordingly, in the example 310 shown in FIG. 3B, full-duplex communication is enabled for the base station 304, which may be operating as a full-duplex node, but not for the UE1 302-1 and UE2 302-2, which may be operating as half-duplex nodes. For example, the base station 304 may have at least two antenna panels (each including one or more antenna elements) such that at least one antenna panel may be used to transmit downlink transmissions concurrently with reception of uplink transmissions by at least one other antenna panel.

Additionally, or alternatively, as shown in FIG. 3C, example 320 includes a UE 302 in communication a base station 304. In this case, the base station 304 may transmit, and the UE 302 may receive, one or more downlink transmissions concurrently with the UE 302 transmitting, and the base station 304 receiving, one or more uplink transmissions. Accordingly, in the example 320 shown in FIG. 3C, full-duplex communication is enabled for both the UE 302 and the base station 304, each of which is operating as a full-duplex node.

Utilizing full-duplex communication may provide reduced latency by allowing a full-duplex node to transmit or receive a downlink signal in an uplink-only slot, or to transmit or receive an uplink signal in a downlink-only slot, which may enable latency savings. In addition, full-duplex communication may enhance spectral efficiency or throughput per cell or per UE, may enable more efficient resource utilization by simultaneously utilizing time and frequency resources for uplink and downlink communication, and/or the like.

Full-duplex communication may be in-band (also referred to as "IBFD" for in-band full duplex), such that the base station 304 configures downlink resources and uplink resources that overlap, at least in part, in time and/or frequency. As an alternative, full-duplex communications may be sub-band (also referred to as "flexible duplex"), such that the base station 304 configures downlink resources and uplink resources that overlap in time but use different frequencies. In some aspects, the base station 304 may further configure a guard band including one or more frequencies between the downlink resources and the uplink resources.

Frequency division multiplexing (e.g., as used in subband full duplex) is usually used in paired spectrum bands (e.g., bands n1, n2, n3, n5, and/or other lower-frequency bands). By using paired bands, the base station 304 may configure one of two paired bands for downlink and another of the two paired bands for uplink. In unpaired spectrum bands (e.g., bands n40, n41, n50, and/or other higher-frequency bands), time division duplexing is usually used. Sub-band full duplex may allow for the base station 304 to use frequency division multiplexing in unpaired spectrum bands. For example, the base station 304 may configure a first portion of frequencies included in the one or more unpaired spectrum bands for downlink and a second portion of frequencies included in the one or more unpaired spectrum bands for uplink.

A UE will transmit a scheduling request (also referred to as an "SR") to a base station (e.g., on a physical uplink control channel (PUCCH) and/or another uplink channel) when the UE has data to transmit to the base station. Accordingly, the base station may, based at least in part on the scheduling request, provide a grant of one or more resources that the UE may use to transmit the data. When the UE transmits a scheduling request to a base station, the UE may transmit the scheduling request in associated with a full-duplex mode or a half-duplex mode (e.g., as described above in connection with FIGS. 3A-3C). For example, the UE may transmit the scheduling request in the full-duplex mode or the half-duplex mode and/or to request to transmit the data according to the half-duplex mode or the full-duplex mode. However, the base station generally cannot differentiate between these modes. For example, higher layers (e.g., a radio link control (RLC) layer, a medium access control (MAC) layer, and/or another layer) of the UE may select a logical channel for transmitting the scheduling request. As used herein, "logical channel" may refer to a channel between an RLC layer and a MAC layer that facilitates downlink communications from the base station to the UE and uplink communications from the UE to the base station. A logical channel may reside in the control plane and carry control information, or may reside in the user plane and carry data. Moreover, lower layers (e.g., a physical layer and/or another layer) of the UE may select at least one resource for transmitting the scheduling request based at least in part on a mapping between the logical channel and a scheduling request configuration that includes the at least one resource. Neither the logical channels nor the scheduling request configurations indicate the full-duplex mode or the half-duplex mode. Accordingly, the base station cannot differentiate between scheduling requests associated with the full-duplex and scheduling requests associated with the half-duplex.

Because the base station cannot differentiate between full-duplex scheduling requests and half-duplex scheduling requests, the base station may provide a grant of one or more resources, such as frequency bands, that result in high self-interference between antenna panels of the UE. This reduces communication quality and/or reliability between the UE and the base station and may increase latency and waste processing resources if the base station has to retransmit downlink data due to high self-interference. Additionally, or alternatively, the base station may provide a grant of one or more resources that are configured for downlink in full-duplex such that the UE has to transmit the data in half-duplex. This reduces throughput between the UE and the base station and increases latency because the UE cannot operate in full-duplex mode when transmitting the data.

Some techniques and apparatuses described herein may allow a base station (e.g., base station 110 and/or base station 304) to indicate scheduling request configurations that include at least one resource associated with a half-duplex mode of a UE (e.g., UE 120 and/or UE 302) and at least one resource associated with a full-duplex mode of the UE 120. Accordingly, the base station 110 may differentiate between scheduling requests sent that are associated with the half-duplex mode and scheduling requests sent that are associated with the full-duplex mode. Thus, the base station 110 may provide a grant of one or more resources, for the UE 120 to transmit data, that reduce self-interference at the UE 120 and are not configured for downlink in the full-duplex mode. This increases communication quality and/or reliability between the UE 120 and the base station 110, conserves processing resources by reducing a chance that the base station has to retransmit downlink data due to self-interference, and increases throughput and reduces latency between the UE 120 and the base station 110 because the UE 120 can operate in the full-duplex mode when transmitting the data.

Additionally, or alternatively, some techniques and apparatuses described herein may allow a base station (e.g., base station 110 and/or base station 304) to indicate logical channel configurations that map a logical channel to a corresponding scheduling request configuration associated with a half-duplex mode of a UE (e.g., UE 120 and/or UE 302), to a corresponding scheduling request configuration associated with a full-duplex mode of the UE 120, or to a combination thereof. Accordingly, the base station 110 may differentiate between scheduling requests sent that are associated the half-duplex mode and scheduling requests sent that are associated the full-duplex mode. As described above, this increases communication quality and/or reliability between the UE 120 and the base station 110, conserves processing resources by reducing a chance that the base station has to retransmit downlink data due to self-interference, and increases throughput and reduces latency between the UE 120 and the base station 110 because the UE 120 can operate in the full-duplex mode when transmitting data associated with the scheduling request.

As indicated above, FIGS. 3A-3C are provided as one or more examples. Other examples may differ from what is described with regard to FIGS. 3A-3C.

Figure 4:
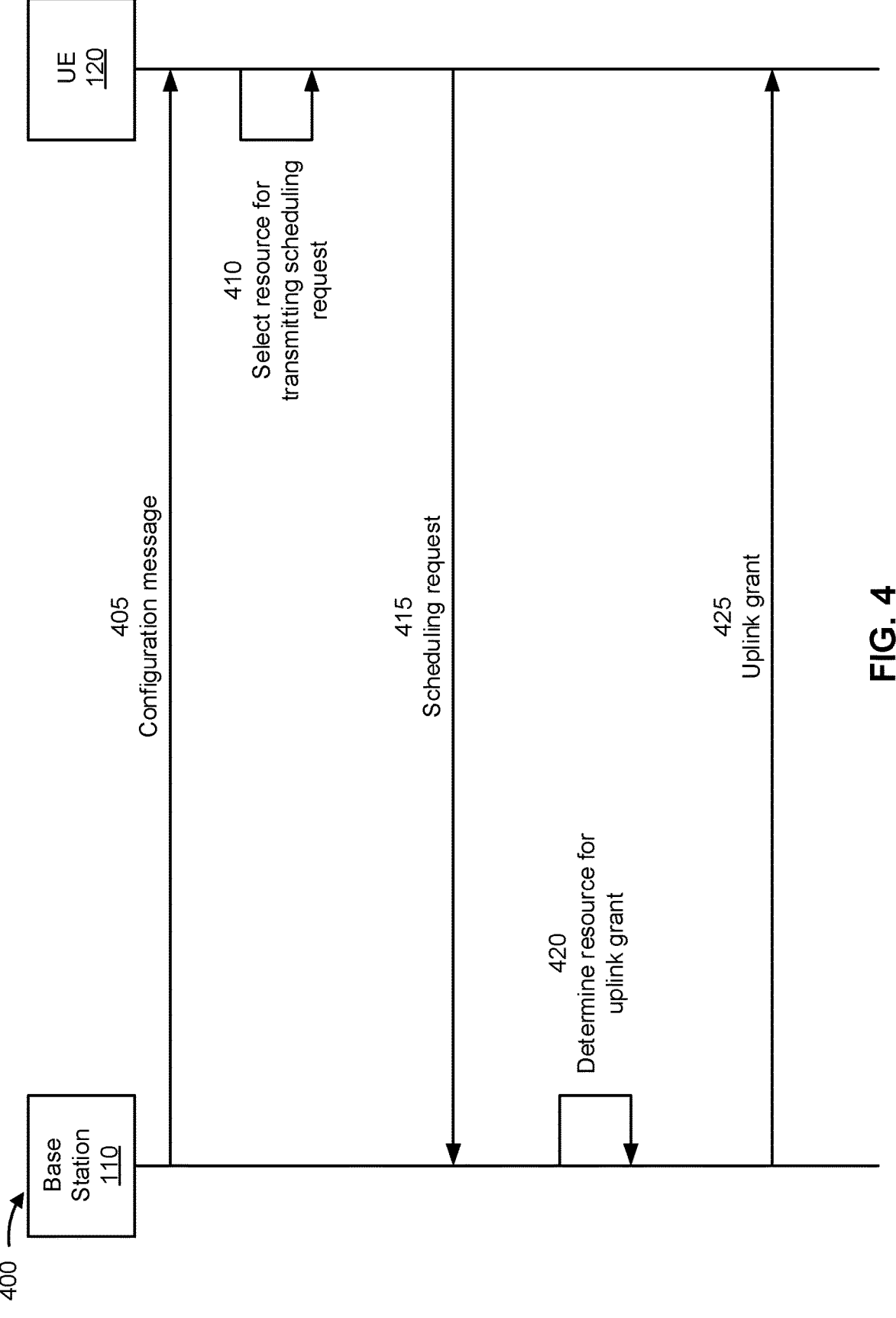
FIG. 4 is a diagram illustrating an example associated with using scheduling request configurations for full-duplex and half-duplex modes, in accordance with the present disclosure.

FIG. 4 is a diagram illustrating an example 400 associated with using scheduling request configurations for full-duplex and half-duplex modes, in accordance with the present disclosure. As shown in FIG. 4, example 400 may include a base station 110 and a UE 120 that communicate with one another. For example, the base station 110 and the UE 120 may be included in a wireless network, such as wireless network 100 of FIG. 1.

As shown in connection with reference number 405, the base station 110 may transmit, and the UE 120 may receive, a configuration message indicating a scheduling request configuration that includes at least one resource associated with a half-duplex mode of the UE 120 and at least one resource associated with a full-duplex mode of the UE 120. For example, the configuration message may include a radio resource control (RRC) message, a MAC control element (MAC-CE), downlink control information (DCI), or a combination thereof.

In some aspects, the scheduling request configuration may include a SchedulingRequestConfig data structure as defined in 3GPP specifications and/or another standard. Although the description below refers to a SchedulingRequestConfig data structure, the description also applies to other similar data structures. The at least one resource associated with the full-duplex mode may be defined using one or more variables. For example, the at least one resource may include one or more frequencies (and/or other portions of a frequency domain) associated with an sr-PUCCH-ResourceIndex variable, as defined in 3GPP specifications and/or another standard, included in the SchedulingRequestConfig data structure. Additionally, or alternatively, the at least one resource may include a subframe (and/or other portion of a time domain) associated with an sr-ConfigIndex variable, as defined in 3GPP specifications and/or another standard, included in the SchedulingRequestConfig data structure. Although the description below refers to an sr-PUCCH-ResourceIndex variable and an sr-ConfigIndex variable, the description also applies to other similar variables that define the at least one resource. The at least one resource associated with the half-duplex mode may be similarly defined.

As shown in connection with reference number 410, the UE 120 may select at least one resource to use when transmitting the scheduling request. In some aspects, the half-duplex mode may be associated with a first bandwidth part (BWP) that is different than a second BWP associated with the full-duplex mode. Accordingly, the UE 120 may select at least one resource within the first BWP when transmitting the scheduling request in association with the half-duplex mode and may select at least one resource within the second BWP when transmitting the scheduling request in association with the full-duplex mode. As used herein, a "bandwidth part" or "BWP" may refer to a contiguous set of physical resource blocks (PRBs), where each PRB includes a set of frequencies corresponding to one or more subcarriers.

As an alternative, the half-duplex mode may share, at least in part, a BWP with the full-duplex mode. Accordingly, the at least one resource associated with the half-duplex mode and the at least one resource associated with the full-duplex mode may be included in at least one BWP that is common to the half-duplex mode and the full-duplex mode.

In some aspects, the scheduling request configuration may include one or more PUCCH resources for the half-duplex mode and one or more other PUCCH resources for the full-duplex mode. Accordingly, the at least one resource associated with the half-duplex mode may include one or more first PUCCH resources, and the at least one resource associated with the full-duplex mode may include one or more second PUCCH resources that are separate from the one or more first PUCCH resources. For example, the SchedulingRequestConfig data structure may include an sr-PUCCH-ResourceIndex variable and/or an sr-ConfigIndex variable that define the one or more first PUCCH resources (e.g., which may be referred to as HD-sr-PUCCH-ResourceIndex and/or HD-sr-ConfigIndex, respectively). Similarly, the SchedulingRequestConfig data structure may include an sr-PUCCH-ResourceIndex variable and/or an sr-ConfigIndex variable that define the one or more second PUCCH resources (e.g., which may be referred to as FD-sr-PUCCH-ResourceIndex and/or FD-sr-ConfigIndex, respectively).

Additionally, or alternatively, the scheduling request configuration may include one or more PUCCH resources that are common to the half-duplex mode and the full-duplex mode. Accordingly, the at least one resource associated with the half-duplex mode and the at least one resource associated with the full-duplex mode may include the one or more PUCCH resources that are common to the half-duplex mode and the full-duplex mode. For example, the SchedulingRequestConfig data structure may include an sr-PUCCH-ResourceIndex variable and/or an sr-ConfigIndex variable that define the one or more first PUCCH resources (e.g., which may be referred to as common-sr-PUCCH-ResourceIndex and/or common-sr-ConfigIndex, respectively).

In any of the aspects described above, the scheduling request configuration may further include a first timer associated with the half-duplex mode and a second timer associated with the full-duplex mode. For example, as described in connection with FIG. 6 below, the SchedulingRequest- Config data structure may include a first sr-ProhibitTimer variable that defines the first timer (e.g., which may be referred to as HD-sr-ProhibitTimer). Similarly, the SchedulingRequestConfig data structure may include a second sr-ProhibitTimer variable that defines the second timer (e.g., which may be referred to as FD-sr-ProhibitTimer). As an alternative, the scheduling request configuration may include a timer common to the half-duplex mode and the full-duplex mode. For example, as described in connection with FIG. 6 below, the SchedulingRequestConfig data structure may include a first sr-ProhibitTimer variable that defines the timer (e.g., which may be referred to as common-sr-ProhibitTimer).

In any of the aspects described above, the scheduling request configuration may further include a counter limit (e.g., a threshold) common to the half-duplex mode and the full-duplex mode. For example, as described in connection with FIG. 6 below, the SchedulingRequestConfig data structure may include a first sr-TransMax variable that defines the counter limit (e.g., which may be referred to as common-sr-TransMax). As an alternative, the scheduling request configuration may further include a first counter limit associated with the half-duplex mode and a second counter limit associated with the full-duplex mode. For example, as described in connection with FIG. 6 below, the SchedulingRequestConfig data structure may include a first sr-TransMax variable that defines the first timer (e.g., which may be referred to as HD-sr-TransMax). Similarly, the SchedulingRequestConfig data structure may include a second sr-TransMax variable that defines the second timer (e.g., which may be referred to as FD-sr-TransMax).

As shown in connection with reference number 415, the UE 120 may transmit, and the base station 110 may receive, a scheduling request using the at least one resource associated with the half-duplex mode or the at least one resource associated with the full-duplex mode. For example, the UE 120 may use the at least one resource selected as described above in connection with reference number 410. In some aspects, the UE 120 may use at least a portion of the process described below in connection with FIG. 6 in order to determine to transmit the scheduling request.

In some aspects, after transmitting the scheduling request, the UE 120 may transmit, and the base station 110 may receive, a random access preamble, based at least in part on a determination that a counter limit (e.g., common to the half-duplex mode and the full-duplex mode) is satisfied. For example, as described below in connection with FIG. 6, the UE 120 may release a PUCCH configuration (along with a sounding reference signal (SRS) configuration, a semi-persistent channel state information (SP-CSI) configuration, a semi-persistent state (SPS) configuration, and/or a configured grant (CG)) associated with the scheduling request based at least in part on a threshold defined by sr-TransMax being satisfied. Moreover, the UE 120 may initiate a random access channel (RACH) procedure with the base station 110.

As an alternative, after transmitting the scheduling request, the UE 120 may transmit, and the base station 110 may receive, a random access preamble, based at least in part on a determination that a first counter limit (e.g., associated with the half-duplex mode) is satisfied or a determination that a second counter limit (e.g., associated with the full-duplex mode) is satisfied. For example, as described below in connection with FIG. 6, when the scheduling request is transmitted in half-duplex, the UE 120 may release a PUCCH configuration (along with an SRS configuration, an SP-CSI configuration, an SPS configuration, and/or a CG) associated with the scheduling request based at least in part on a threshold defined by HD-sr-TransMax being satisfied. Moreover, the UE 120 may initiate a RACH procedure with the base station 110. Similarly, as described below in connection with FIG. 6, when the scheduling request is transmitted in full-duplex, the UE 120 may release a PUCCH configuration (along with an SRS configuration, an SP-CSI configuration, an SPS configuration, and/or a CG) associated with the scheduling request based at least in part on a threshold defined by FD-sr-TransMax being satisfied. Moreover, the UE 120 may initiate a RACH procedure with the base station 110.

As shown in connection with reference number 420, the base station 110 may determine at least one resource to use in an uplink grant. For example, as described above in connection with reference number 410, the half-duplex mode may be associated with a first band BWP that is different than a second BWP associated with the full-duplex mode such that the base station 110 may distinguish scheduling requests associated with the full-duplex mode from scheduling requests associated with the half-duplex mode. Accordingly, the base station 110 may determine the at least one resource based at least in part on whether the scheduling request is associated with the full-duplex mode or with the half-duplex mode. For example, the base station 110 may select at least one resource for the half-duplex mode that is otherwise reserved for downlink in the full-duplex mode. Additionally, or alternatively, the base station 110 may select at least one resource for the full-duplex mode that causes less self-interference at the UE 120 (e.g., based at least in part on a report from the UE 120 that was based at least in part on one or more interference measurements taken by the UE 120).

Additionally, or alternatively, and as described above in connection with reference number 410, the scheduling request configuration may include one or more PUCCH resources for the half-duplex mode and one or more other PUCCH resources for the full-duplex mode, such that the base station 110 may distinguish scheduling requests associated with the full-duplex mode from scheduling requests associated with the half-duplex mode. Accordingly, the base station 110 may determine the at least one resource based at least in part on whether the scheduling request is associated with the full-duplex mode or with the half-duplex mode, as described above.

As an alternative, and as described above in connection with reference number 410, the scheduling request configuration may include one or more PUCCH resources for the half-duplex mode and one or more other PUCCH resources for the full-duplex mode. Accordingly, the base station 110 may determine the at least one resource such that the at least one resource can be used in the full-duplex mode or the half-duplex mode. In some aspects, the base station 110 may still distinguish scheduling requests associated with the full-duplex mode from scheduling requests associated with the half-duplex mode based at least in part on a logical channel associated with the scheduling request (e.g., as described below in connection with FIG. 5). Accordingly, the base station 110 may determine the at least one resource based at least in part on whether the scheduling request is associated with the full-duplex mode or with the half-duplex mode, as described above.

As shown in connection with reference number 425, the base station 110 may transmit, and the UE 120 may receive, the uplink grant. For example, the uplink grant may be included in DCI, a MAC-CE, or a combination thereof. Accordingly, the UE 120 may transmit data to the base station 110 based at least in part on the uplink grant.

Additionally, the UE 120 may transmit the data in the full-duplex mode or the half-duplex mode based at least in part on whether the scheduling request was associated with the full-duplex mode or with the half-duplex mode.

By using techniques as described in connection with FIG. 4, the base station 110 may indicate scheduling request configurations that include at least one resource associated with a half-duplex mode of the UE 120 and at least one resource associated with a full-duplex mode of the UE 120. Accordingly, the base station 110 may differentiate between scheduling requests sent that are associated with the half-duplex mode and scheduling requests sent that are associated with the full-duplex mode. Thus, the base station 110 may provide a grant of one or more resources, for the UE 120 to transmit data, that reduce self-interference at the UE 120 and are not configured for downlink in the full-duplex mode. This increases communication quality and/or reliability between the UE 120 and the base station 110, conserves processing resources by reducing a chance that the base station has to retransmit downlink data due to self-interference, and increases throughput and reduces latency between the UE 120 and the base station 110 because the UE 120 can operate in the full-duplex mode when transmitting the data.

As indicated above, FIG. 4 is provided as an example. Other examples may differ from what is described with respect to FIG. 4.

Figure 5:
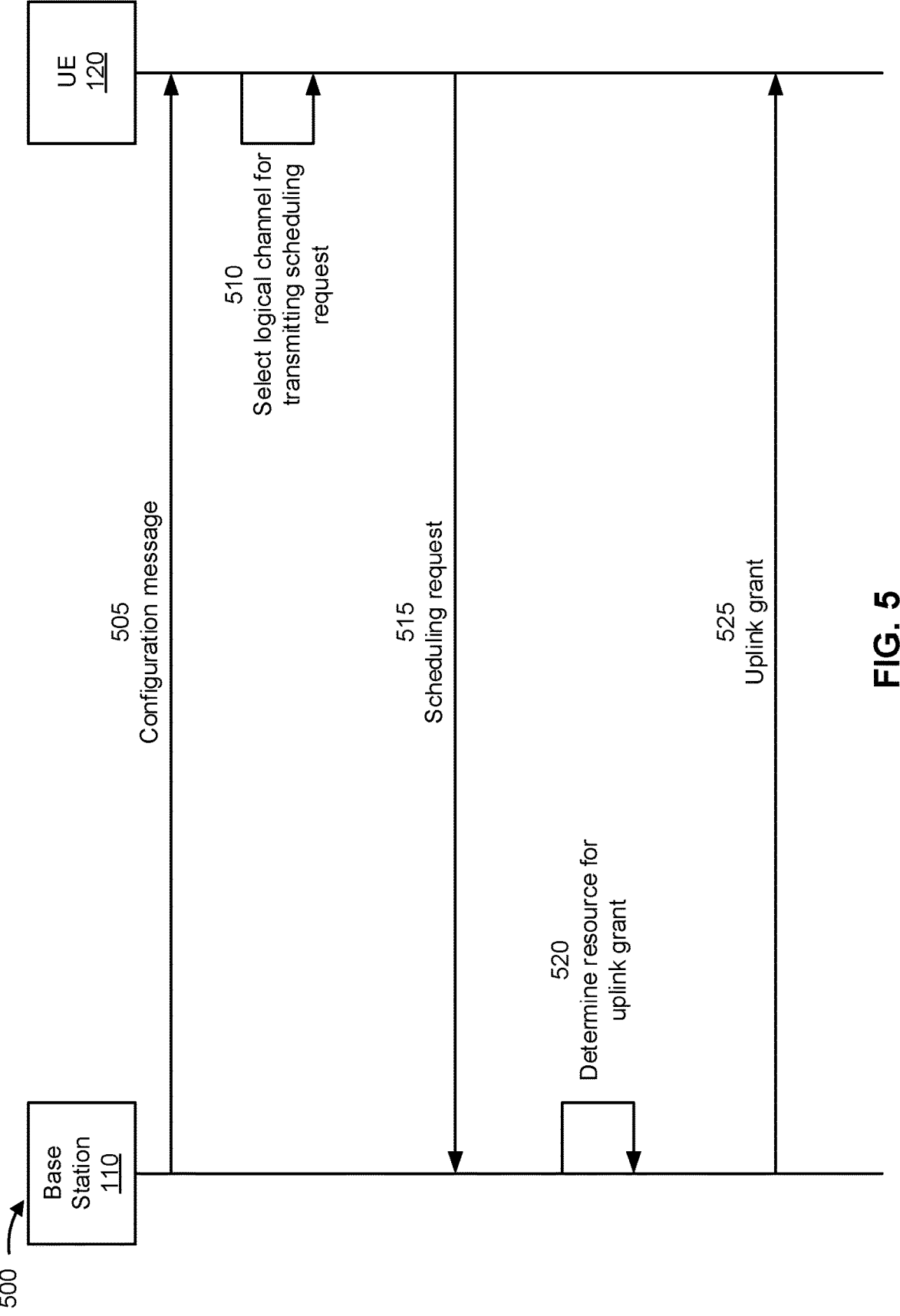
FIG. 5 is a diagram illustrating an example associated with using logical channels for full-duplex and half-duplex modes, in accordance with the present disclosure.

FIG. 5 is a diagram illustrating an example 500 associated with using logical channels for full-duplex and half-duplex modes, in accordance with the present disclosure. As shown in FIG. 5, example 500 may include a base station 110 and a UE 120 that communicate with one another. For example, the base station 110 and the UE 120 may be included in a wireless network, such as wireless network 100 of FIG. 1.

As shown in connection with reference number 505, the base station 110 may transmit, and the UE 120 may receive, a configuration message indicating a logical channel configuration that maps a logical channel to a corresponding scheduling request configuration associated with a half-duplex mode of the UE 120, to a corresponding scheduling request configuration associated with a full-duplex mode of the UE 120, or to a combination thereof. For example, the configuration message may include an RRC message, a MAC-CE, DCI, or a combination thereof.

In some aspects, the logical channel configuration may include a LogicalChannelConfig data structure as defined in 3GPP specifications and/or another standard. Although the description below refers to a LogicalChannelConfig data structure, the description also applies to other similar data structures. The logical channel may be defined using one or more variables. For example, the logical channel may have a priority associated with apriority integer, a bit rate associated with a prioritisedBitRate variable, a bucket size associated with a bucketSizeDuration variable, and/or a subcarrier spacing (SCS) associated with an allowedSCS-List variable, as defined in 3GPP specifications and/or another standard, included in the LogicalChannelConfig data structure. Although the description below refers to priority, prioritisedBitRate, bucketSizeDuration, and/or allowedSCS-List variables, the description also applies to other similar data variables that define the logical channel.

Additionally, the LogicalChannelConfig data structure may indicate a mapping to a corresponding scheduling request configuration. For example, the LogicalChannel-Config data structure may include a schedulingRequestID identifier that maps to a corresponding identifier included in a SchedulingRequestConfig data structure (e.g., as described above in connection with FIG. 4) that defines the corresponding scheduling request configuration.

In some aspects, each logical channel may map to one scheduling request configuration. As described above in connection with FIG. 4, the scheduling request configuration may include one or more PUCCH resources for the half-duplex mode and one or more other PUCCH resources for the full-duplex mode. Additionally, or alternatively, and as described above in connection with FIG. 4, the scheduling request configuration may include one or more PUCCH resources that are common to the half-duplex mode and the full-duplex mode. In some aspects, the logical channel configuration may further include an indicator excluding the logical channel from being used in the half-duplex mode or in the full-duplex mode. For example, the LogicalChannel-Config data structure may include an allowedDuplexMode variable (e.g., as defined in 3GPP specifications and/or another standard) that indicates whether the logical channel can be used for the full-duplex mode and/or the half-duplex mode. Additionally, or alternatively, the logical channel configuration may implicitly exclude the logical channel from being used in the full-duplex mode by not mapping the logical channel to a scheduling request configuration that is associated with the full-duplex mode and/or that includes one or more PUCCH resources associated with the full-duplex mode. Similarly, the logical channel configuration may implicitly exclude the logical channel from being used in the half-duplex mode by not mapping the logical channel to a scheduling request configuration that is associated with the half-duplex mode and/or that includes one or more PUCCH resources associated with the half-duplex mode. Accordingly, in some aspects, the base station 110 may exclude a logical channel associated with an ultra-reliable low-latency communication (URLLC) service, an enhanced mobile broadband (eMBB) service, and/or another service from the full-duplex mode or the half-duplex mode.

As an alternative, each logical channel may map to two or more scheduling request configurations. For example, the LogicalChannelConfig data structure may include a plurality of schedulingRequestID identifiers that map to a corresponding identifier included in a SchedulingRequestConfig data structure. In some aspects, the two or more scheduling request configurations may include at least one scheduling request configuration associated with the full-duplex mode (e.g., indicated by an FD-schedulingRequestID identifier) and at least one scheduling request configuration associated with the half-duplex mode (e.g., indicated by an HD-schedulingRequestID identifier). In some aspects, the logical channel configuration may explicitly exclude the logical channel from being used in the half-duplex mode or in the full-duplex mode (e.g., using an allowedDuplexMode variable as described above). Additionally, or alternatively, the logical channel configuration may implicitly exclude the logical channel from being used in the full-duplex mode by including a null value in the FD-schedulingRequestID identifier and/or by not mapping the logical channel to a scheduling request configuration that is associated with the full-duplex mode and/or that includes one or more PUCCH resources associated with the full-duplex mode. Similarly, the logical channel configuration may implicitly exclude the logical channel from being used in the half-duplex mode by including a null value in the HD-schedulingRequestID identifier and/or by not mapping the logical channel to a scheduling request configuration that is associated with the half-duplex mode and/or that includes one or more PUCCH resources associated with the half-duplex mode. Accordingly, in some aspects, the base station 110 may exclude a logical channel associated with a URLLC service, an eMBB service, and/or another service from the full-duplex mode or the half-duplex mode.

In any of the aspects described above, each logical channel may be associated with the half-duplex mode or with the full-duplex mode. For example, the LogicalChannelConfig data structure may include a duplexMode variable (e.g., as defined in 3GPP specifications and/or another standard) that indicates whether the logical channel is associated with the full-duplex mode or the half-duplex mode.

As shown in connection with reference number 510, the UE 120 may select the logical channel to use when transmitting the scheduling request. In some aspects, and as described above, the half-duplex mode may be associated with one or more first logical channels that are different than one or more second logical channels associated with the full-duplex mode. Accordingly, the UE 120 may select from the one or more first logical channels when transmitting the scheduling request in association with the half-duplex mode and may select from the one or more second logical channels when transmitting the scheduling request in association with the full-duplex mode.

As an alternative, and as described above, the logical channels may not be separated between the half-duplex mode and the full-duplex mode. Accordingly, when the selected logical channel is associated with a plurality of scheduling request configurations, the UE 120 may select amongst the plurality of scheduling request configurations based at least in part on whether the scheduling request will be transmitted in association with the half-duplex mode or association with the full-duplex mode. Additionally, or alternatively, when a scheduling request configuration associated with the selected logical channel (or selected amongst a plurality of scheduling request configurations that are associated with the selected logical channel) includes at least one resource associated with the half-duplex mode that is different from at least one resource associated with the full-duplex mode, the UE 120 may select amongst the resources included in the scheduling request configuration based at least in part on whether the scheduling request will be transmitted in association with the half-duplex mode or association with the full-duplex mode.

As shown in connection with reference number 515, the UE 120 may transmit, and the base station 110 may receive, a scheduling request using the logical channel. For example, the UE 120 may use the logical channel selected as described above in connection with reference number 510. In some aspects, the UE 120 may use at least a portion of the process described below in connection with FIG. 6 in order to determine to transmit the scheduling request.

In some aspects, after transmitting the scheduling request, the UE 120 may transmit, and the base station 110 may receive, a random access preamble, based at least in part on a determination that a counter limit (e.g., common to the half-duplex mode and the full-duplex mode, or associated with a same mode as is associated with the scheduling request) is satisfied. For example, as described below in connection with FIG. 6, the UE 120 may release a PUCCH configuration (along with an SRS configuration, an SP-CSI configuration, an SPS configuration, and/or a CG) associated with the scheduling request based at least in part on a threshold defined by sr-TransMax being satisfied. Moreover, the UE 120 may initiate a RACH procedure with the base station 110.

As shown in connection with reference number 520, the base station 110 may determine at least one resource to use in an uplink grant. For example, as described above in connection with reference number 505, the half-duplex mode may be associated with one or more first logical channels that are different than one or more second logical channels associated with the full-duplex mode such that the base station 110 may distinguish scheduling requests associated with the full-duplex mode from scheduling requests associated with the half-duplex mode. Accordingly, the base station 110 may determine the at least one resource based at least in part on whether the scheduling request is associated with the full-duplex mode or with the half-duplex mode. For example, the base station 110 may select at least one resource for the half-duplex mode that is otherwise reserved for downlink in the full-duplex mode. Additionally, or alternatively, the base station 110 may select at least one resource for the full-duplex mode that causes less self-interference at the UE 120 (e.g., based at least in part on a report from the UE 120 that was based at least in part on one or more interference measurements taken by the UE 120).

As an alternative, and as described above in connection with reference number 505, the logical channel may not be indicated as associated with the full-duplex mode or the half-duplex mode. Accordingly, the base station 110 may determine the at least one resource such that the at least one resource can be used in the full-duplex mode or the half-duplex mode. In some aspects, the base station 110 may still distinguish scheduling requests associated with the full-duplex mode from scheduling requests associated with the half-duplex mode based at least in part on one or more PUCCH resources used to transmit the scheduling request (e.g., as described above in connection with FIG. 6). For example, the logical channel may be associated with one or more first scheduling request configurations associated with the half-duplex mode that are different from one or more second scheduling request configurations associated with the full-duplex mode, such that the base station 110 may distinguish scheduling requests associated with the full-duplex mode from scheduling requests associated with the half-duplex mode. Additionally, or alternatively, the logical channel may be associated with a scheduling request configuration that includes one or more first PUCCH resources associated with the half-duplex mode that are different from one or more second PUCCH resources associated with the full-duplex mode, such that the base station 110 may distinguish scheduling requests associated with the full-duplex mode from scheduling requests associated with the half-duplex mode. Accordingly, the base station 110 may determine the at least one resource based at least in part on whether the scheduling request is associated with the full-duplex mode or with the half-duplex mode, as described above.

As shown in connection with reference number 525, the base station 110 may transmit, and the UE 120 may receive, the uplink grant. For example, the uplink grant may be included in DCI, a MAC-CE, or a combination thereof. Accordingly, the UE 120 may transmit data to the base station 110 based at least in part on the uplink grant. Additionally, the UE 120 may transmit the data in the full-duplex mode or the half-duplex mode based at least in part on whether the scheduling request was associated with the full-duplex mode or with the half-duplex mode.

By using techniques as described in connection with FIG. 5, the base station 110 may indicate logical channel configurations that map a logical channel to a corresponding scheduling request configuration associated with a half-duplex mode of the UE 120, to a corresponding scheduling request configuration associated with a full-duplex mode of the UE 120, or to a combination thereof. Accordingly, the base station 110 may differentiate between scheduling requests sent in association with the half-duplex mode and scheduling requests sent in association with the full-duplex mode.

As indicated above, FIG. 5 is provided as an example. Other examples may differ from what is described with respect to FIG. 5.

Figure 6:
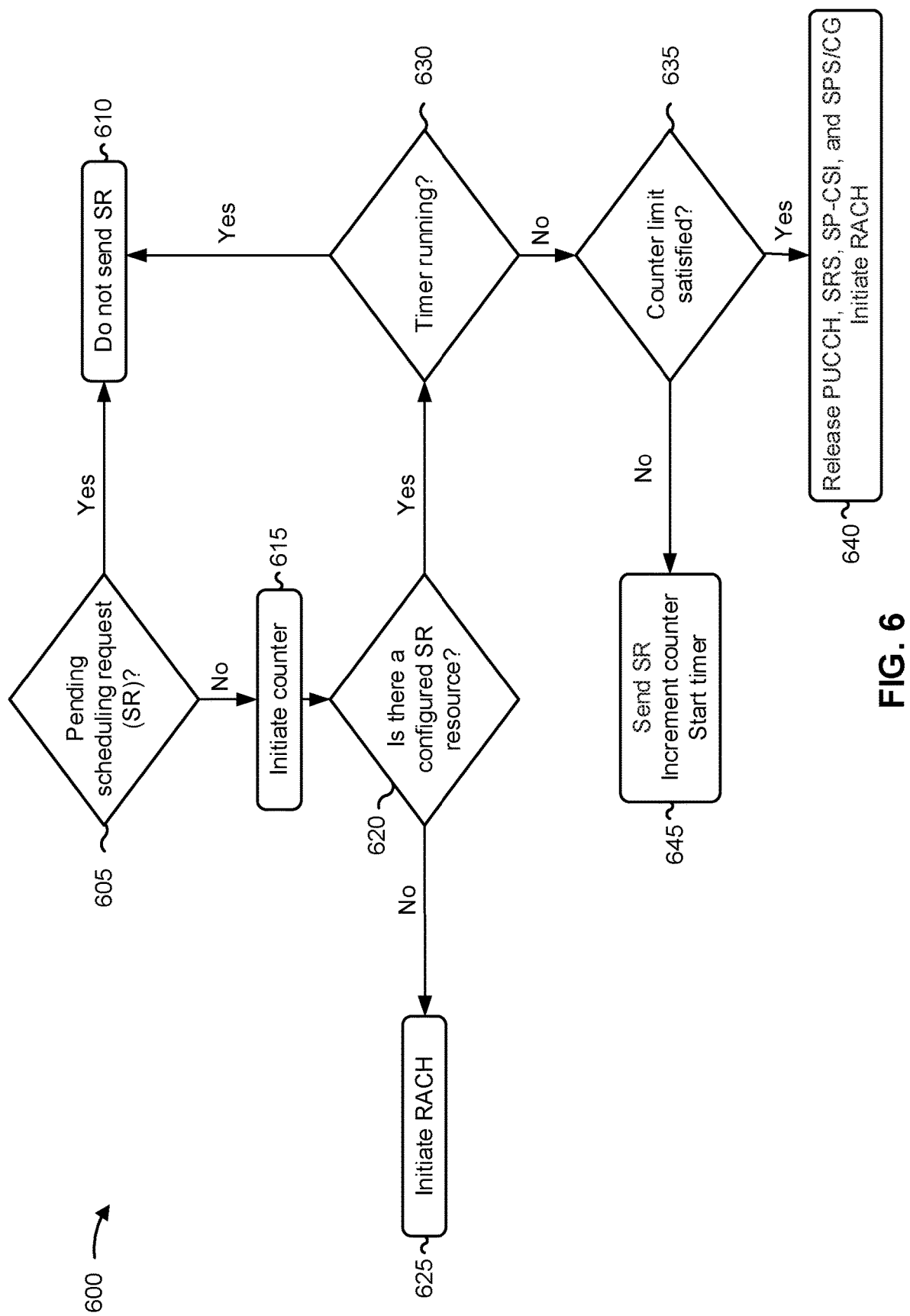
FIG. 6 is a diagram illustrating an example associated with a scheduling request process for full-duplex and half-duplex modes, in accordance with the present disclosure.

FIG. 6 is a diagram illustrating an example 600 associated with a scheduling request process for full-duplex and half-duplex modes, in accordance with the present disclosure. Example 600 may be used by a UE (e.g., UE 120) before the UE 120 transmits a scheduling request (e.g., as described above in connection with FIG. 4 and/or FIG. 5).

As shown in connection with reference number 605, before transmitting a scheduling request, the UE 120 may determine whether a previous scheduling request is currently pending. In some aspects, the UE 120 may only check for pending scheduling requests associated with a same mode as is associated with the scheduling request. For example, the UE 120 may check for pending half-duplex mode scheduling requests when attempting to transmit the scheduling request in association with the half-duplex mode. Similarly, the UE 120 may check for pending full-duplex mode scheduling requests when attempting to transmit the scheduling request in association with the full-duplex mode.

As shown in connection with reference number 610, the UE 120 may refrain from transmitting the scheduling request when a scheduling request is already pending. Accordingly, the UE 120 may refrain from transmitting the scheduling request when the determination described above in connection with reference number 605 returns '1' or TRUE.

As shown in connection with reference number 615, when no scheduling request is already pending (e.g., the determination described above in connection with reference number 605 returns '0' or FALSE), the UE 120 may initiate a counter for the scheduling request. For example, the UE 120 may initialize an SR_COUNTER variable as defined in 3GPP specifications and/or another standard to 0. In some aspects, the UE 120 may initialize a first variable when the scheduling request is associated with the full-duplex mode (e.g., an FD_SR_COUNTER) that is different than a second variable used when the scheduling request is associated with the half-duplex mode (e.g., an HD_SR_COUNTER).

As shown in connection with reference number 620, the UE 120 may determine whether at least one resource (e.g., a PUCCH resource) is configured for the scheduling request. In some aspects, the UE 120 may only check for resources associated with a same mode as is associated with the scheduling request. For example, the UE 120 may check for resources associated with the half-duplex mode when attempting to transmit the scheduling request in association with the half-duplex mode. Similarly, the UE 120 may check for resources associated with the full-duplex mode when attempting to transmit the scheduling request in association with the full-duplex mode.

As shown in connection with reference number 625, the UE 120 may initiate a RACH procedure (e.g., by transmitting a random access preamble) when there is no resource configured for the scheduling request. Accordingly, the UE 120 may transmit the random access preamble when the determination described above in connection with reference number 620 returns '0' or FALSE. In some aspects, the UE 120 may initiate the RACH procedure using the same mode as is associated with the scheduling request. For example, the UE 120 may transmit the random access preamble in the full-duplex mode when the scheduling request is associated with the full-duplex mode, and the UE 120 may transmit the random access preamble in the half-duplex mode when the scheduling request is associated with the half-duplex mode.

As shown in connection with reference number 630, when at least one resource is configured (e.g., the determination described above in connection with reference number 620 returns '1' or TRUE), the UE 120 may check whether a timer associated with the scheduling request is running. For example, the UE 120 may check whether an sr-Prohibit-Timer as defined in 3GPP specifications and/or another standard is running. In some aspects, the UE 120 may check a first timer when the scheduling request is associated with the full-duplex mode (e.g., an FD-sr-ProhibitTimer) that is different than a second timer used when the scheduling request is associated with the half-duplex mode (e.g., an HD-sr-ProhibitTimer).

The UE 120 may refrain from transmitting the scheduling request when the timer is running. Accordingly, the UE 120 may refrain from transmitting the scheduling request when the determination described above in connection with reference number 630 returns '1' or TRUE.

As shown in connection with reference number 635, when the timer is not running (e.g., the determination described above in connection with reference number 630 returns '0' or FALSE), the UE 120 may check whether a counter limit (e.g., a threshold) associated with the scheduling request is satisfied. For example, the UE 120 may check whether SR_COUNTER satisfies a sr-TransMax threshold as defined in 3GPP specifications and/or another standard. In some aspects, the UE 120 may check a first counter limit when the scheduling request is associated with the full-duplex mode (e.g., whether FD_SR_COUNTER satisfies FD-sr-Trans-Max) that is different than a second counter limit used when the scheduling request is associated with the half-duplex mode (e.g., whether HD_SR_COUNTER satisfies HD-sr-TransMax).

As shown in connection with reference number 640, when the counter limit is satisfied (e.g., the determination described above in connection with reference number 635 returns '1' or TRUE), the UE 120 may release a PUCCH configuration (along with an SRS configuration, an SP-CSI configuration, an SPS configuration, and/or a CG) associated with the scheduling request. Additionally, the UE 120 may initiate a RACH procedure (e.g., by transmitting a random access preamble). In some aspects, the UE 120 may initiate the RACH procedure using the same mode as is associated with the scheduling request. For example, the UE 120 may transmit the random access preamble in the full-duplex mode when the scheduling request is associated with the full-duplex mode, and the UE 120 may transmit the random access preamble in the half-duplex mode when the scheduling request is associated with the half-duplex mode.

As shown in connection with reference number 645, when the counter limit is not satisfied (e.g., the determination described above in connection with reference number 635 returns '0' or FALSE), the UE 120 may transmit the scheduling request. Additionally, the UE 120 may increment the counter associated with the scheduling request. For example, the UE 120 may increment a first counter when the scheduling request is associated with the full-duplex mode (e.g., FD_SR_COUNTER) that is different than a second counter used when the scheduling request is associated with the half-duplex mode (e.g., HD_SR_COUNTER). Additionally, the UE 120 may begin a timer associated with the scheduling request such that the timer is now running. For example, the UE 120 may begin a first timer when the scheduling request is associated with the full-duplex mode (e.g., FD-sr-ProhibitTimer) that is different than a second timer used when the scheduling request is associated with the half-duplex mode (e.g., HD-sr-ProhibitTimer). Accordingly, the UE 120 may retransmit that scheduling request when the corresponding timer has expired and the corresponding counter limit is not yet satisfied.

As indicated above, FIG. 6 is provided as an example. Other examples may differ from what is described with respect to FIG. 6.

FIG. 7 is a diagram illustrating an example process 700 performed, for example, by a UE, in accordance with the present disclosure. Example process 700 is an example where the UE (e.g., UE 120 and/or apparatus 1100 of FIG. 11) performs operations associated with using scheduling request configurations for full-duplex and half-duplex modes.

As shown in FIG. 7, in some aspects, process 700 may include receiving, from a base station (e.g., base station 110 and/or apparatus 1200 of FIG. 12), a configuration message indicating a scheduling request configuration that includes at least one resource associated with a half-duplex mode of the UE and at least one resource associated with a full-duplex mode of the UE (block 710). For example, the UE (e.g., using reception component 1102, depicted in FIG. 11) may receive the configuration message indicating the scheduling request configuration that includes at least one resource associated with the half-duplex mode of the UE and at least one resource associated with the full-duplex mode of the UE, as described above.

As further shown in FIG. 7, in some aspects, process 700 may include transmitting, to the base station, a scheduling request using the at least one resource associated with the half-duplex mode or the at least one resource associated with the full-duplex mode (block 720). For example, the UE (e.g., using transmission component 1104, depicted in FIG. 11) may transmit the scheduling request using the at least one resource associated with the half-duplex mode or the at least one resource associated with the full-duplex mode, as described above.

Process 700 may include additional aspects, such as any single aspect or any combination of aspects described below and/or in connection with one or more other processes described elsewhere herein.

In a first aspect, the at least one resource associated with the half-duplex mode and the at least one resource associated with the full-duplex mode are included in at least one BWP that is common to the half-duplex mode and the full-duplex mode.

In a second aspect, alone or in combination with the first aspect, the at least one resource associated with the half-duplex mode includes one or more first PUCCH resources, and the at least one resource associated with the full-duplex mode includes one or more second PUCCH resources that are separate from the one or more first PUCCH resources.

In a third aspect, alone or in combination with one or more of the first and second aspects, the scheduling request configuration includes one or more PUCCH resources that are common to the half-duplex mode and the full-duplex mode.

In a fourth aspect, alone or in combination with one or more of the first through third aspects, the scheduling request configuration further includes a first timer associated with the half-duplex mode and a second timer associated with the full-duplex mode.

In a fifth aspect, alone or in combination with one or more of the first through fourth aspects, the scheduling request is transmitted based at least in part on a determination (e.g., using determination component 1108, depicted in FIG. 11) that the first timer is not running or a determination that the second timer is not running.

In a sixth aspect, alone or in combination with one or more of the first through fifth aspects, the scheduling request configuration further includes a counter limit common to the half-duplex mode and the full-duplex mode.

In a seventh aspect, alone or in combination with one or more of the first through sixth aspects, the scheduling request is transmitted based at least in part on a determination (e.g., using determination component 1108) that the counter limit is not satisfied.

In an eighth aspect, alone or in combination with one or more of the first through seventh aspects, process 700 further includes transmitting (e.g., using transmission component 1104), to the base station and after transmitting the scheduling request, a random access preamble, based at least in part on a determination (e.g., using determination component 1108) that the counter limit is satisfied.

In a ninth aspect, alone or in combination with one or more of the first through eighth aspects, the scheduling request configuration further includes a first counter limit associated with the half-duplex mode and a second counter limit associated with the full-duplex mode.

In a tenth aspect, alone or in combination with one or more of the first through ninth aspects, the scheduling request is transmitted based at least in part on a determination (e.g., using determination component 1108) that the first counter limit is not satisfied or a determination (e.g., using determination component 1108) that the second counter limit is not satisfied.

In an eleventh aspect, alone or in combination with one or more of the first through tenth aspects, the scheduling request configuration further includes a timer common to the half-duplex mode and the full-duplex mode.

In a twelfth aspect, alone or in combination with one or more of the first through eleventh aspects, the scheduling request is transmitted based at least in part on a determination (e.g., using determination component 1108) that the timer is not running.

In a thirteenth aspect, alone or in combination with one or more of the first through twelfth aspects, process 700 further includes transmitting (e.g., using transmission component 1104), to the base station and after transmitting the scheduling request, a random access preamble, based at least in part on a determination (e.g., using determination component 1108) that the first counter limit is satisfied or a determination (e.g., using determination component 1108) that the second counter limit is satisfied.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with the present disclosure. Example process 800 is an example where the base station (e.g., base station 110 and/or apparatus 1200 of FIG. 12) performs operations associated with using scheduling request configurations for full-duplex and half-duplex modes.

As shown in FIG. 8, in some aspects, process 800 may include transmitting, to a UE (e.g., UE 120 and/or apparatus 1100 of FIG. 11), a configuration message indicating a scheduling request configuration that includes at least one resource associated with a half-duplex mode of the UE and at least one resource associated with a full-duplex mode of the UE (block 810). For example, the base station (e.g., using transmission component 1204, depicted in FIG. 12) may transmit the configuration message indicating a scheduling request configuration that includes at least one resource associated with the half-duplex mode of the UE and at least one resource associated with the full-duplex mode of the UE, as described above.

As further shown in FIG. 8, in some aspects, process 800 may include receiving, from the UE, a scheduling request using the at least one resource associated with the half-duplex mode or the at least one resource associated with the full-duplex mode (block 820). For example, the base station (e.g., using reception component 1202, depicted in FIG. 12) may receive the scheduling request using the at least one resource associated with the half-duplex mode or the at least one resource associated with the full-duplex mode, as described above.

Process 800 may include additional aspects, such as any single aspect or any combination of aspects described below and/or in connection with one or more other processes described elsewhere herein.

In a first aspect, the at least one resource associated with the half-duplex mode and the at least one resource associated with the full-duplex mode are included in at least one BWP that is common to the half-duplex mode and the full-duplex mode.

In a second aspect, alone or in combination with the first aspect, the at least one resource associated with the half-duplex mode includes one or more first PUCCH resources, and the at least one resource associated with the full-duplex mode includes one or more second PUCCH resources that are separate from the one or more first PUCCH resources.

In a third aspect, alone or in combination with one or more of the first and second aspects, the scheduling request configuration one or more PUCCH resources that are common to the half-duplex mode and the full-duplex mode.

In a fourth aspect, alone or in combination with one or more of the first through third aspects, the scheduling request configuration further includes a first timer associated with the half-duplex mode and a second timer associated with the full-duplex mode.

In a fifth aspect, alone or in combination with one or more of the first through fourth aspects, the scheduling request is received based at least in part on the first timer not running or the second timer not running.

In a sixth aspect, alone or in combination with one or more of the first through fifth aspects, the scheduling request configuration further includes a counter limit common to the half-duplex mode and the full-duplex mode.

In a seventh aspect, alone or in combination with one or more of the first through sixth aspects, the scheduling request is received based at least in part on the counter limit not being satisfied.

In an eighth aspect, alone or in combination with one or more of the first through seventh aspects, process 800 further includes receiving (e.g., using reception component 1202), from the UE and after receiving the scheduling request, a random access preamble, based at least in part on the counter limit being satisfied.

In a ninth aspect, alone or in combination with one or more of the first through eighth aspects, the scheduling request configuration further includes a first counter limit associated with the half-duplex mode and a second counter limit associated with the full-duplex mode.

In a tenth aspect, alone or in combination with one or more of the first through ninth aspects, the scheduling request is received based at least in part on the first counter limit not being satisfied or the second counter limit not being satisfied.

In an eleventh aspect, alone or in combination with one or more of the first through tenth aspects, the scheduling request configuration further includes a timer common to the half-duplex mode and the full-duplex mode.

In a twelfth aspect, alone or in combination with one or more of the first through eleventh aspects, the scheduling request is received based at least in part on the timer not running.

In a thirteenth aspect, alone or in combination with one or more of the first through twelfth aspects, process 800 further includes receiving (e.g., using reception component 1202), from the UE and after receiving the scheduling request, a random access preamble, based at least in part on the first counter limit being satisfied or the second counter limit being satisfied.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with the present disclosure. Example process 900 is an example where the UE (e.g., UE 120 and/or apparatus 1100 of FIG. 11) performs operations associated with using logical channels for full-duplex and half-duplex modes.

As shown in FIG. 9, in some aspects, process 900 may include receiving, from a base station (e.g., base station 110 and/or apparatus 1200 of FIG. 12), a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof (block 910). For example, the UE (e.g., using reception component 1102, depicted in FIG. 11) may receive the configuration message indicating a logical channel configuration that maps a logical channel to a corresponding scheduling request configuration associated with the half-duplex mode of the UE, to a corresponding scheduling request configuration associated with the full-duplex mode of the UE, or to a combination thereof, as described above.

As further shown in FIG. 9, in some aspects, process 900 may include transmitting, to the base station, a scheduling request using the logical channel (block 920). For example, the UE (e.g., using transmission component 1104, depicted in FIG. 11) may transmit the scheduling request using the logical channel, as described above.

Process 900 may include additional aspects, such as any single aspect or any combination of aspects described below and/or in connection with one or more other processes described elsewhere herein.

In some aspects, the logical channel configuration further includes an indicator excluding the logical channel from being used in the half-duplex mode or in the full-duplex mode.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a base station, in accordance with the present disclosure. Example process 1000 is an example where the base station (e.g., base station 110 and/or apparatus 1200 of FIG. 12) performs operations associated with using logical channels for full-duplex and half-duplex modes.

As shown in FIG. 10, in some aspects, process 1000 may include transmitting, to a UE (e.g., UE 120 and/or apparatus 1100 of FIG. 11), a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof (block 1010). For example, the base station (e.g., using transmission component 1204, depicted in FIG. 12) may transmit the configuration message indicating a logical channel configuration that maps a logical channel to a corresponding scheduling request configuration associated with the half-duplex mode of the UE, to a corresponding scheduling request configuration associated with the full-duplex mode of the UE, or to a combination thereof, as described above.

As further shown in FIG. 10, in some aspects, process 1000 may include receiving, from the UE, a scheduling request using the logical channel (block 1020). For example, the base station (e.g., using reception component 1202, depicted in FIG. 12) may receive the scheduling request using the logical channel, as described above.

Process 1000 may include additional aspects, such as any single aspect or any combination of aspects described below and/or in connection with one or more other processes described elsewhere herein.

In some aspects, the logical channel configuration further includes an indicator excluding the logical channel from being used in the half-duplex mode or in the full-duplex mode.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
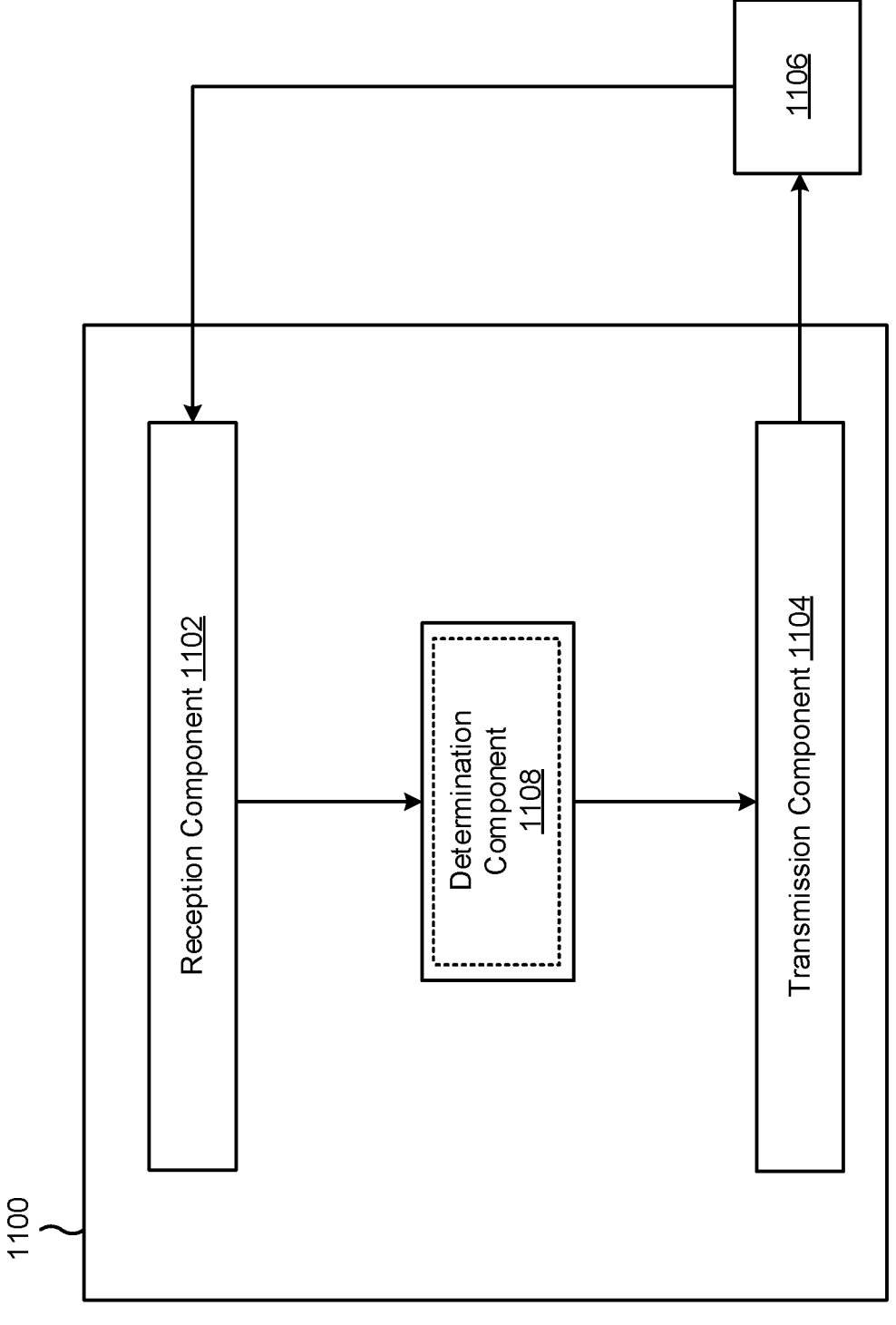
FIGS. 11 and 12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 4-6. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

In some aspects, the reception component 1102 may receive, from the apparatus 1106, a configuration message indicating a scheduling request configuration that includes at least one resource associated with a half-duplex mode of the apparatus 1100 and at least one resource associated with a full-duplex mode of the apparatus 1100. Accordingly, the transmission component 1104 may transmit, to the apparatus 1106, a scheduling request using the at least one resource associated with the half-duplex mode or the at least one resource associated with the full-duplex mode.

In some aspects, the scheduling request configuration may include a first timer associated with the half-duplex mode and a second timer associated with the full-duplex mode. Accordingly, the determination component 1108 may determine that the first timer is not running or that the second timer is not running. In some aspects, the determination component 1108 may include a transmit MIMO processor, a transmit processor, a MIO detector, a receive processor, a controller/processor, a memory, or a combination thereof, of the UE described above in connection with FIG. 2. Accordingly, the transmission component 1104 may transmit the scheduling request based at least in part on the determination that the first timer is not running or the determination that the second timer is not running.

As an alternative, the scheduling request configuration may include a timer common to the half-duplex mode and the full-duplex mode. Accordingly, the determination component 1108 may determine that the timer is not running. Accordingly, the transmission component 1104 may transmit the scheduling request based at least in part on the determination that the timer is not running.

Additionally, or alternatively, the scheduling request configuration may include a counter limit common to the half-duplex mode and the full-duplex mode. Accordingly, the determination component 1108 may determine that the counter limit is not satisfied. Accordingly, the transmission component 1104 may transmit the scheduling request based at least in part on the determination that the counter limit is not satisfied. In some aspects, the determination component 1108 may determine that the counter limit is satisfied. Accordingly, transmission component 1104 may transmit, to the apparatus 1106 and after transmitting the scheduling request, a random access preamble, based at least in part on the determination that the counter limit is satisfied.

As an alternative, the scheduling request configuration may include a first counter limit associated with the half-duplex mode and a second counter limit associated with the full-duplex mode. Accordingly, the determination component 1108 may determine that the first counter limit is not satisfied or that the second counter limit is not satisfied. Accordingly, the transmission component 1104 may transmit the scheduling request based at least in part on the determination that the first counter limit is not satisfied or the determination that the second counter limit is not satisfied. In some aspects, the determination component 1108 may determine that the first counter limit is satisfied or that the second counter limit is satisfied. Accordingly, the transmission component 1104 may transmit, to the apparatus 1106 and after transmitting the scheduling request, a random access preamble, based at least in part on the determination that the first counter limit is satisfied or the determination that the second counter limit is satisfied.

In some aspects, the configuration message may additionally or alternatively indicate a logical channel configuration that maps a logical channel to a corresponding scheduling request configuration associated with the half-duplex mode of the apparatus 1100, to a corresponding scheduling request configuration associated with the full-duplex mode of the apparatus 1100, or to a combination thereof. Accordingly, the transmission component 1104 may transmit the scheduling request to the apparatus 1106 using the logical channel.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
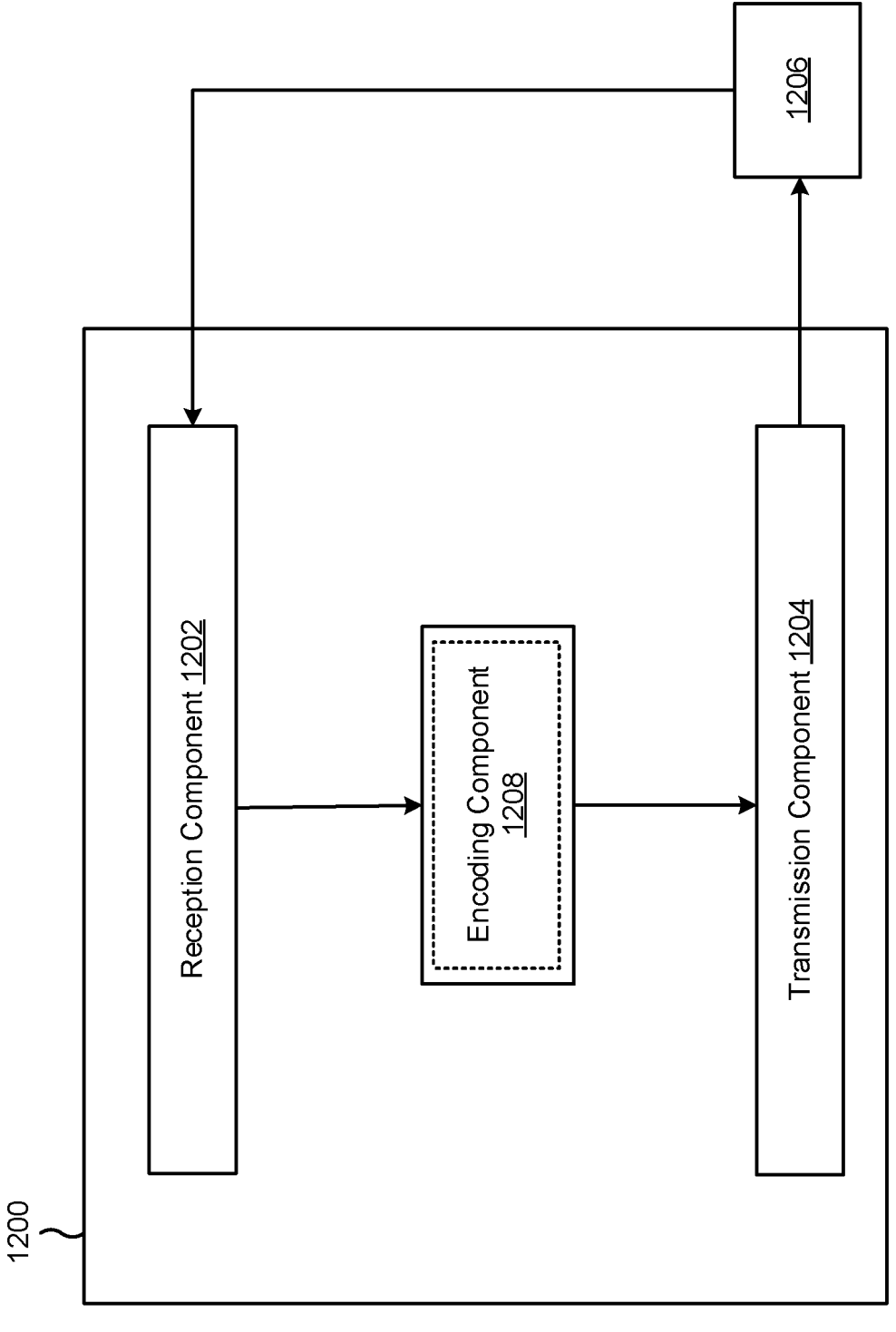

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include an encoding component 1208, among other examples.

In some aspects, the apparatus 1200 may be configured to perform one or more operations described herein in connection with FIG. 4-5. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The transmission component 1204 may transmit, to the apparatus 1206, a configuration message indicating a scheduling request configuration that includes at least one resource associated with a half-duplex mode of the apparatus 1206 and at least one resource associated with a full-duplex mode of the apparatus 1206. Accordingly, the reception component 1202 may receive, from the apparatus 1206, a scheduling request using the at least one resource associated with the half-duplex mode or the at least one resource associated with the full-duplex mode.

In some aspects, the scheduling request configuration may include a first timer associated with the half-duplex mode and a second timer associated with the full-duplex mode. Accordingly, the encoding component 1208 may encode the first timer and the second timer into the configuration message. In some aspects, the encoding component 1208 may include one or more antennas, a modulator, a transmit MIMO processor, a transmit processor, a controller/processor, a memory, or a combination thereof, of the base station described above in connection with FIG. 2. Accordingly, the reception component 1202 may receive the scheduling request when the first timer is not running or the second timer is not running.

As an alternative, the scheduling request configuration may include a timer common to the half-duplex mode and the full-duplex mode. Accordingly, the encoding component 1208 may encode the timer into the configuration message. Accordingly, the reception component 1202 may receive the scheduling request when the timer is not running.

Additionally, or alternatively, the scheduling request configuration may include a counter limit common to the half-duplex mode and the full-duplex mode. Accordingly, the encoding component 1208 may encode the counter limit into the configuration message. Accordingly, the reception component 1202 may receive the scheduling request when the counter limit is not satisfied. In some aspects, the reception component 1202 may receive, from the apparatus 1206 and after receiving the scheduling request, a random access preamble, based at least in part on the counter limit being satisfied.

As an alternative, the scheduling request configuration may include a first counter limit associated with the half-duplex mode and a second counter limit associated with the full-duplex mode. Accordingly, the encoding component 1208 may encode the first counter limit and the second counter limit into the configuration message. Accordingly, the reception component 1202 may receive the scheduling request when the first counter limit is not satisfied or the second counter limit is not satisfied. In some aspects, the reception component 1202 may receive, from the apparatus 1206 and after receiving the scheduling request, a random access preamble, based at least in part on the first counter limit being satisfied or the second counter limit being satisfied.

In some aspects, the configuration message may additionally or alternatively indicate a logical channel configuration that maps a logical channel to a corresponding scheduling request configuration associated with the half-duplex mode of the apparatus 1206, to a corresponding scheduling request configuration associated with the full-duplex mode of the apparatus 1206, or to a combination thereof. Accordingly, the reception component 1202 may receive the scheduling request from the apparatus 1206 using the logical channel.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a base station, a configuration message indicating a scheduling request configuration that includes at least one resource associated with a half-duplex mode of the UE and at least one resource associated with a full-duplex mode of the UE; and transmitting, to the base station, a scheduling request using the at least one resource associated with the half-duplex mode or the at least one resource associated with the full-duplex mode.

Aspect 2: The method of Aspect 1, wherein the at least one resource associated with the half-duplex mode and the at least one resource associated with the full-duplex mode are included in at least one bandwidth part that is common to the half-duplex mode and the full-duplex mode.

Aspect 3: The method of any of Aspects 1 through 2, wherein the at least one resource associated with the half-duplex mode includes one or more first physical uplink control channel (PUCCH) resources, and the at least one resource associated with the full-duplex mode includes one or more second PUCCH resources that are separate from the one or more first PUCCH resources.

Aspect 4: The method of any of Aspects 1 through 3, wherein the scheduling request configuration includes one or more physical uplink control channel (PUCCH) resources that are common to the half-duplex mode and the full-duplex mode.

Aspect 5: The method of any of Aspects 1 through 4, wherein the scheduling request configuration further includes a first timer associated with the half-duplex mode and a second timer associated with the full-duplex mode.

Aspect 6: The method of Aspect 5, wherein the scheduling request is transmitted based at least in part on a determination that the first timer is not running or a determination that the second timer is not running.

Aspect 7: The method of any of Aspects 1 through 6, wherein the scheduling request configuration further includes a counter limit common to the half-duplex mode and the full-duplex mode.

Aspect 8: The method of Aspect 7, wherein the scheduling request is transmitted based at least in part on a determination that the counter limit is not satisfied.

Aspect 9: The method of any of Aspects 7 through 8, further comprising: transmitting, to the base station and after transmitting the scheduling request, a random access preamble, based at least in part on a determination that the counter limit is satisfied.

Aspect 10: The method of any of Aspects 1 through 6, wherein the scheduling request configuration further includes a first counter limit associated with the half-duplex mode and a second counter limit associated with the full-duplex mode.

Aspect 11: The method of Aspect 10, wherein the scheduling request is transmitted based at least in part on a determination that the first counter limit is not satisfied or a determination that the second counter limit is not satisfied.

Aspect 12: The method of any of Aspects 10 through 11, wherein the scheduling request configuration further includes a timer common to the half-duplex mode and the full-duplex mode.

Aspect 13: The method of Aspect 12, wherein the scheduling request is transmitted based at least in part on a determination that the timer is not running.

Aspect 14: The method of any of Aspects 10 through 13, further comprising: transmitting, to the base station and after transmitting the scheduling request, a random access preamble, based at least in part on a determination that the first counter limit is satisfied or a determination that the second counter limit is satisfied.

Aspect 15: The method of any of Aspects 1 through 14, wherein the configuration message further indicates a logical channel configuration that maps a logical channel to a corresponding scheduling request configuration associated with the half-duplex mode of the UE, to a corresponding scheduling request configuration associated with the full-duplex mode of the UE, or to a combination thereof, and wherein the scheduling request is transmitted using the logical channel.

Aspect 16: The method of Aspect 15, wherein the logical channel configuration further includes an indicator excluding the logical channel from being used in the half-duplex mode or in the full-duplex mode.

Aspect 17: A method of wireless communication performed by a base station, comprising: transmitting, to a user equipment (UE), a configuration message indicating a scheduling request configuration that includes at least one resource associated with a half-duplex mode of the UE and at least one resource associated with a full-duplex mode of the UE; and receiving, from the UE, a scheduling request using the at least one resource associated with the half-duplex mode or the at least one resource associated with the full-duplex mode.

Aspect 18: The method of Aspect 17, wherein the at least one resource associated with the half-duplex mode and the at least one resource associated with the full-duplex mode are included in at least one bandwidth part that is common to the half-duplex mode and the full-duplex mode.

Aspect 19: The method of any of Aspects 17 through 18, wherein the at least one resource associated with the half-duplex mode includes one or more first physical uplink control channel (PUCCH) resources, and the at least one resource associated with the full-duplex mode includes one or more second PUCCH resources that are separate from the one or more first PUCCH resources.

Aspect 20: The method of any of Aspects 17 through 19, wherein the scheduling request configuration includes one or more physical uplink control channel (PUCCH) resources that are common to the half-duplex mode and the full-duplex mode.

Aspect 21: The method of any of Aspects 17 through 20, wherein the scheduling request configuration further includes a first timer associated with the half-duplex mode and a second timer associated with the full-duplex mode.

Aspect 22: The method of Aspect 21, wherein the scheduling request is received based at least in part on the first timer not running or the second timer not running.

Aspect 23: The method of any of Aspects 17 through 22, wherein the scheduling request configuration further includes a counter limit common to the half-duplex mode and the full-duplex mode.

Aspect 24: The method of Aspect 23, wherein the scheduling request is received based at least in part on the counter limit not being satisfied.

Aspect 25: The method of any of Aspects 23 through 24, further comprising: receiving, from the UE and after receiving the scheduling request, a random access preamble, based at least in part on the counter limit being satisfied.

Aspect 26: The method of any of Aspects 17 through 22, wherein the scheduling request configuration further includes a first counter limit associated with the half-duplex mode and a second counter limit associated with the full-duplex mode.

Aspect 27: The method of Aspect 26, wherein the scheduling request is received based at least in part on the first counter limit not being satisfied or the second counter limit not being satisfied.

Aspect 28: The method of any of Aspects 26 through 27, wherein the scheduling request configuration further includes a timer common to the half-duplex mode and the full-duplex mode.

Aspect 29: The method of Aspect 28, wherein the scheduling request is received based at least in part on the timer not running.

Aspect 30: The method of any of Aspects 26 through 29, further comprising: receiving, from the UE and after receiving the scheduling request, a random access preamble, based at least in part on the first counter limit being satisfied or the second counter limit being satisfied.

Aspect 31: The method of any of Aspects 17 through 30, wherein the configuration message further indicates a logical channel configuration that maps a logical channel to a corresponding scheduling request configuration associated with the half-duplex mode of the UE, to a corresponding scheduling request configuration associated with the full-duplex mode of the UE, or to a combination thereof, wherein the scheduling request is received using the logical channel.

Aspect 32: The method of Aspect 31, wherein the logical channel configuration further includes an indicator excluding the logical channel from being used in the half-duplex mode or in the full-duplex mode.

Aspect 33: A method of wireless communication performed by a user equipment (UE), comprising: receiving, from a base station, a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof, and transmitting, to the base station, a scheduling request using the logical channel.

Aspect 34: The method of Aspect 33, wherein the logical channel configuration further includes an indicator excluding the logical channel from being used in the half-duplex mode or in the full-duplex mode.

Aspect 35: A method of wireless communication performed by a base station, comprising: transmitting, to a user equipment (UE), a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof, and receiving, from the UE, a scheduling request using the logical channel.

Aspect 36: The method of Aspect 35, wherein the logical channel configuration further includes an indicator excluding the logical channel from being used in the half-duplex mode or in the full-duplex mode.

Aspect 37: An apparatus for wireless communication at a device, comprising a processor; memory coupled with the processor; and instructions stored in the memory and executable by the processor to cause the apparatus to perform the method of one or more of Aspects 1-16.

Aspect 38: A device for wireless communication, comprising a memory and one or more processors coupled to the memory, the memory and the one or more processors configured to perform the method of one or more of Aspects 1-16.

Aspect 39: An apparatus for wireless communication, comprising at least one means for performing the method of one or more of Aspects 1-16.

Aspect 40: A non-transitory computer-readable medium storing code for wireless communication, the code comprising instructions executable by a processor to perform the method of one or more of Aspects 1-16.

Aspect 41: A non-transitory computer-readable medium storing a set of instructions for wireless communication, the set of instructions comprising one or more instructions that, when executed by one or more processors of a device, cause the device to perform the method of one or more of Aspects 1-16.

Aspect 42: An apparatus for wireless communication at a device, comprising a processor; memory coupled with the processor; and instructions stored in the memory and executable by the processor to cause the apparatus to perform the method of one or more of Aspects 17-32.

Aspect 43: A device for wireless communication, comprising a memory and one or more processors coupled to the memory, the memory and the one or more processors configured to perform the method of one or more of Aspects 17-32.

Aspect 44: An apparatus for wireless communication, comprising at least one means for performing the method of one or more of Aspects 17-32.

Aspect 45: A non-transitory computer-readable medium storing code for wireless communication, the code comprising instructions executable by a processor to perform the method of one or more of Aspects 17-32.

Aspect 46: A non-transitory computer-readable medium storing a set of instructions for wireless communication, the set of instructions comprising one or more instructions that, when executed by one or more processors of a device, cause the device to perform the method of one or more of Aspects 17-32.

Aspect 47: An apparatus for wireless communication at a device, comprising a processor; memory coupled with the processor; and instructions stored in the memory and executable by the processor to cause the apparatus to perform the method of one or more of Aspects 33-34.

Aspect 48: A device for wireless communication, comprising a memory and one or more processors coupled to the memory, the memory and the one or more processors configured to perform the method of one or more of Aspects 33-34.

Aspect 49: An apparatus for wireless communication, comprising at least one means for performing the method of one or more of Aspects 33-34.

Aspect 50: A non-transitory computer-readable medium storing code for wireless communication, the code comprising instructions executable by a processor to perform the method of one or more of Aspects 33-34.

Aspect 51: A non-transitory computer-readable medium storing a set of instructions for wireless communication, the set of instructions comprising one or more instructions that, when executed by one or more processors of a device, cause the device to perform the method of one or more of Aspects 33-34.

Aspect 52: An apparatus for wireless communication at a device, comprising a processor; memory coupled with the processor; and instructions stored in the memory and executable by the processor to cause the apparatus to perform the method of one or more of Aspects 35-36.

Aspect 53: A device for wireless communication, comprising a memory and one or more processors coupled to the memory, the memory and the one or more processors configured to perform the method of one or more of Aspects 35-36.

Aspect 54: An apparatus for wireless communication, comprising at least one means for performing the method of one or more of Aspects 35-36.

Aspect 55: A non-transitory computer-readable medium storing code for wireless communication, the code comprising instructions executable by a processor to perform the method of one or more of Aspects 35-36.

Aspect 56: A non-transitory computer-readable medium storing a set of instructions for wireless communication, the set of instructions comprising one or more instructions that, when executed by one or more processors of a device, cause the device to perform the method of one or more of Aspects 35-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors coupled to the memory, the memory and the one or more processors configured to:
        receive, from a base station, a configuration message indicating a scheduling request configuration that includes at least one resource associated with a half-duplex mode of the UE and at least one resource associated with a full-duplex mode of the UE; and
        transmit, to the base station, a scheduling request using the at least one resource associated with the half-duplex mode or the at least one resource associated with the full-duplex mode.

2. The UE of claim 1, wherein the at least one resource associated with the half-duplex mode and the at least one resource associated with the full-duplex mode are included in at least one bandwidth part that is common to the half-duplex mode and the full-duplex mode.

3. The UE of claim 1, wherein the at least one resource associated with the half-duplex mode includes one or more first physical uplink control channel (PUCCH) resources, and the at least one resource associated with the full-duplex mode includes one or more second PUCCH resources that are separate from the one or more first PUCCH resources.

4. The UE of claim 1, wherein the scheduling request configuration includes one or more physical uplink control channel (PUCCH) resources that are common to the half-duplex mode and the full-duplex mode.

5. The UE of claim 1, wherein the scheduling request configuration further includes a first timer associated with the half-duplex mode and a second timer associated with the full-duplex mode.

6. The UE of claim 5, wherein the scheduling request is transmitted based at least in part on a determination that the first timer is not running or a determination that the second timer is not running.

7. The UE of claim 5, wherein the scheduling request configuration further includes a counter limit common to the half-duplex mode and the full-duplex mode.

8. The UE of claim 7, wherein the scheduling request is transmitted based at least in part on a determination that the counter limit is not satisfied.

9. The UE of claim 7, wherein the memory and the one or more processors are further configured to:
    transmit, to the base station and after transmitting the scheduling request, a random access preamble, based at least in part on a determination that the counter limit is satisfied.

10. The UE of claim 1, wherein the scheduling request configuration further includes a first counter limit associated with the half-duplex mode and a second counter limit associated with the full-duplex mode.

11. The UE of claim 10, wherein the scheduling request is transmitted based at least in part on a determination that the first counter limit is not satisfied or a determination that the second counter limit is not satisfied.

12. The UE of claim 10, wherein the scheduling request configuration further includes a timer common to the half-duplex mode and the full-duplex mode.

13. The UE of claim 12, wherein the scheduling request is transmitted based at least in part on a determination that the timer is not running.

14. The UE of claim 10, wherein the memory and the one or more processors are further configured to:
    transmit, to the base station and after transmitting the scheduling request, a random access preamble, based at least in part on a determination that the first counter limit is satisfied or a determination that the second counter limit is satisfied.

15. A base station for wireless communication, comprising:
    a memory; and
    one or more processors coupled to the memory, the memory and the one or more processors configured to:
        transmit, to a user equipment (UE), a configuration message indicating a scheduling request configuration that includes at least one resource associated with a half-duplex mode of the UE and at least one resource associated with a full-duplex mode of the UE; and
        receive, from the UE, a scheduling request using the at least one resource associated with the half-duplex mode or the at least one resource associated with the full-duplex mode.

16. The base station of claim 15, wherein the at least one resource associated with the half-duplex mode includes one or more first physical uplink control channel (PUCCH) resources, and the at least one resource associated with the full-duplex mode includes one or more second PUCCH resources that are separate from the one or more first PUCCH resources.

17. The base station of claim 15, wherein the scheduling request configuration further includes a first timer associated with the half-duplex mode and a second timer associated with the full-duplex mode.

18. The base station of claim 17, wherein the scheduling request is received based at least in part on the first timer not running or the second timer not running.

19. The base station of claim 17, wherein the scheduling request configuration further includes a counter limit common to the half-duplex mode and the full-duplex mode.

20. The base station of claim 19, wherein the scheduling request is received based at least in part on the counter limit not being satisfied.

21. The base station of claim 19, wherein the memory and the one or more processors are further configured to:
   receive, from the UE and after receiving the scheduling request, a random access preamble, based at least in part on the counter limit being satisfied.

22. The base station of claim 17, wherein the scheduling request configuration further includes a first counter limit associated with the half-duplex mode and a second counter limit associated with the full-duplex mode.

23. The base station of claim 22, wherein the scheduling request is received based at least in part on the first counter limit not being satisfied or the second counter limit not being satisfied.

24. The base station of claim 22, wherein the scheduling request configuration further includes a timer common to the half-duplex mode and the full-duplex mode.

25. The base station of claim 24, wherein the scheduling request is received based at least in part on the timer not running.

26. The base station of claim 22, wherein the memory and the one or more processors are further configured to:
   receive, from the UE and after receiving the scheduling request, a random access preamble, based at least in part on the first counter limit being satisfied or the second counter limit being satisfied.

27. A user equipment (UE) for wireless communication, comprising:

a memory; and
one or more processors coupled to the memory, the memory and the one or more processors configured to:
   receive, from a base station, a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof, and
   transmit, to the base station, a scheduling request using the logical channel.

28. The UE of claim 27, wherein the logical channel configuration further includes an indicator excluding the logical channel from being used in the half-duplex mode or in the full-duplex mode.

29. A base station for wireless communication, comprising:
   a memory; and
   one or more processors coupled to the memory, the memory and the one or more processors configured to:
      transmit, to a user equipment (UE), a configuration message indicating a logical channel configuration that maps a logical channel to a corresponding scheduling request configuration associated with a half-duplex mode of the UE, to a corresponding scheduling request configuration associated with a full-duplex mode of the UE, or to a combination thereof, and
      receive, from the UE, a scheduling request using the logical channel.

30. The base station of claim 29, wherein the logical channel configuration further includes an indicator excluding the logical channel from being used in the half-duplex mode or in the full-duplex mode.

* * * * *